(12) United States Patent  
Kratochwil et al.

(10) Patent No.: US 8,948,713 B2  
(45) Date of Patent: Feb. 3, 2015

(54) ANTENNA IMPEDANCE/POWER AMPLIFIER SOURCE IMPEDANCE MEASUREMENT CIRCUITRY AND DEVICE OPERATION BASED THEREON

(75) Inventors: Konrad Kratochwil, Sunnyvale, CA (US); Marcellus Forbes, Mountain View, CA (US); Arya Reza Behzad, Poway, CA (US)

(73) Assignee: Broadcom Corporation, Irvine, CA (US)

( * ) Notice: Subject to any disclaimer, the term of this patent is extended or adjusted under 35 U.S.C. 154(b) by 635 days.

(21) Appl. No.: 12/814,249

(22) Filed: Jun. 11, 2010

(65) Prior Publication Data

US 2010/0317297 A1 Dec. 16, 2010

Related U.S. Application Data

(60) Provisional application No. 61/187,353, filed on Jun. 16, 2009.

(51) Int. Cl.
| | |
|---|---|
| *H03C 1/62* | (2006.01) |
| *H04W 52/52* | (2009.01) |
| *H04B 17/00* | (2006.01) |
| *H04W 52/02* | (2009.01) |

(52) U.S. Cl.  
CPC .......... *H04W 52/52* (2013.01); *H04B 17/0032* (2013.01); *H04W 52/0251* (2013.01); *Y02B 60/50* (2013.01)  
USPC .................................................. 455/115.1

(58) Field of Classification Search  
CPC ......... H04B 17/0032; H04W 52/0251; H04W 52/52  
USPC ............................................ 455/67.11, 115.1  
See application file for complete search history.

(56) References Cited

U.S. PATENT DOCUMENTS

| | | | | |
|---|---|---|---|---|
| 3,835,379 | A * | 9/1974 | Templin ........................ | 324/630 |
| 7,071,776 | B2 * | 7/2006 | Forrester et al. .............. | 330/129 |
| 7,460,842 | B2 * | 12/2008 | Black et al. ................. | 455/127.1 |
| 2004/0208260 | A1 * | 10/2004 | Chan et al. ..................... | 375/297 |
| 2005/0239423 | A1 * | 10/2005 | Thornell-Pers ............ | 455/127.1 |
| 2007/0197180 | A1 * | 8/2007 | McKinzie et al. ......... | 455/248.1 |
| 2007/0232236 | A1 * | 10/2007 | Kasha et al. ............... | 455/67.14 |
| 2010/0177707 | A1 * | 7/2010 | Essinger et al. .............. | 370/329 |
| 2010/0317297 | A1 * | 12/2010 | Kratochwil et al. ....... | 455/67.11 |
| 2011/0086598 | A1 * | 4/2011 | Ali et al. ..................... | 455/115.1 |

* cited by examiner

*Primary Examiner* — David Bilodeau  
(74) *Attorney, Agent, or Firm* — Garlick & Markison; Randy W. Lacasse

(57) ABSTRACT

A wireless device includes impedance determination and processing circuitry. The impedance determination circuitry determines load impedance at an output of at least one Radio Frequency (RF) power amplifier of the wireless device. The processing circuitry couples to the impedance determination circuitry and alters at least one operating parameter of the wireless device based upon the determined load impedance. Alteration of at least one operating parameter of the wireless device may include altering a gain of at least one transmit path component, altering a gain of at least one receive path component, altering tuning settings of at least one transmit path component, altering tuning settings of at least one receive path component, altering a rail voltage setting, altering baseband processing pre-distortion settings, altering baseband processing receive signal processing operations, altering antenna configuration settings, altering antenna tuning parameters, altering antenna diversity settings, and altering Multi Input Multi Output (MIMO) settings.

20 Claims, 19 Drawing Sheets

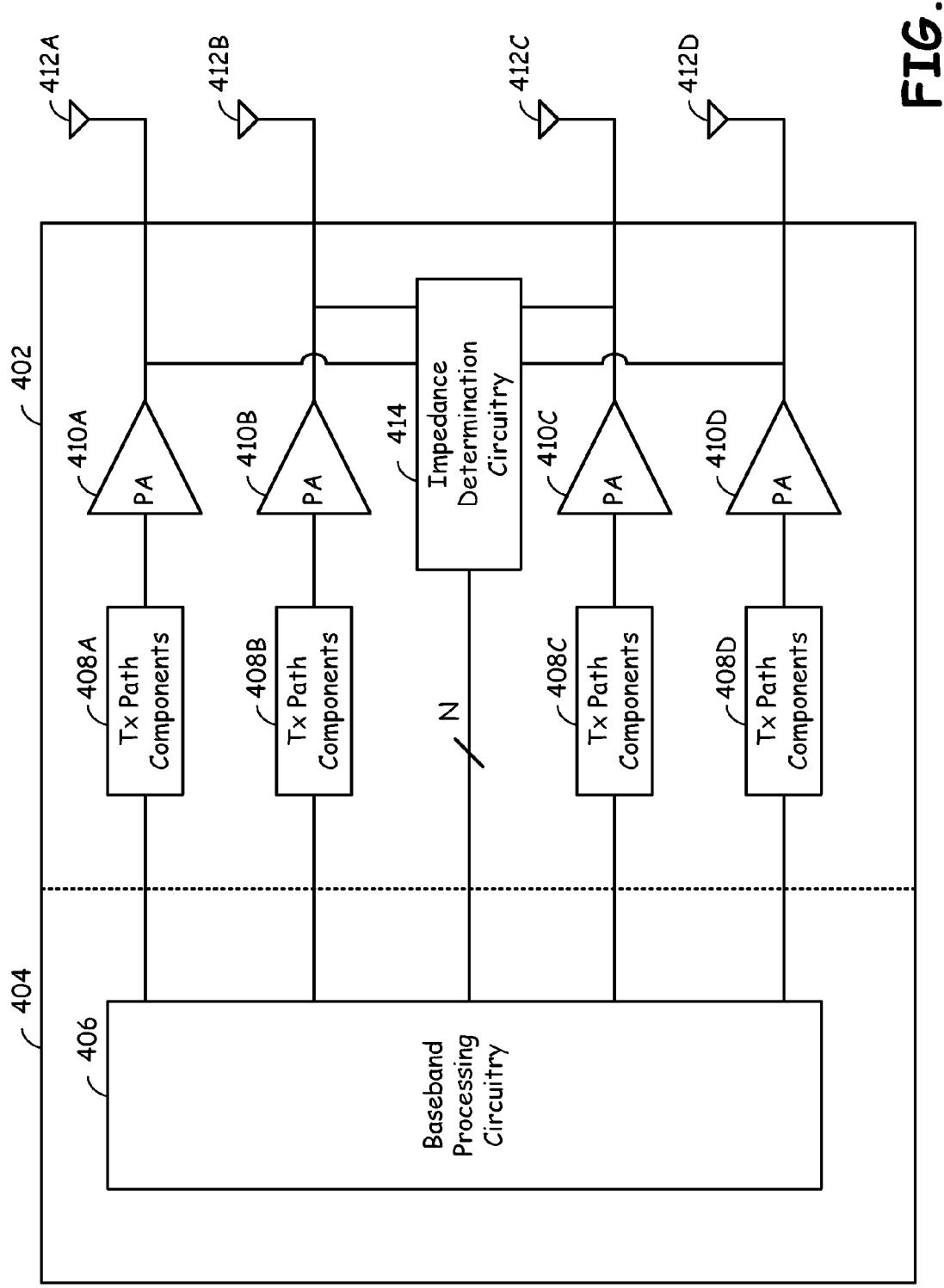

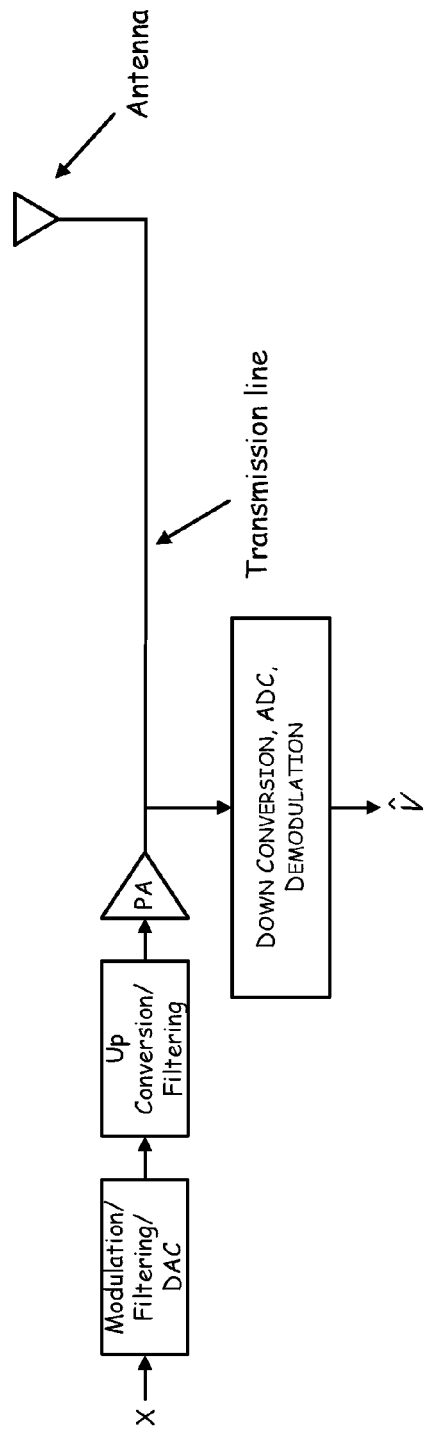
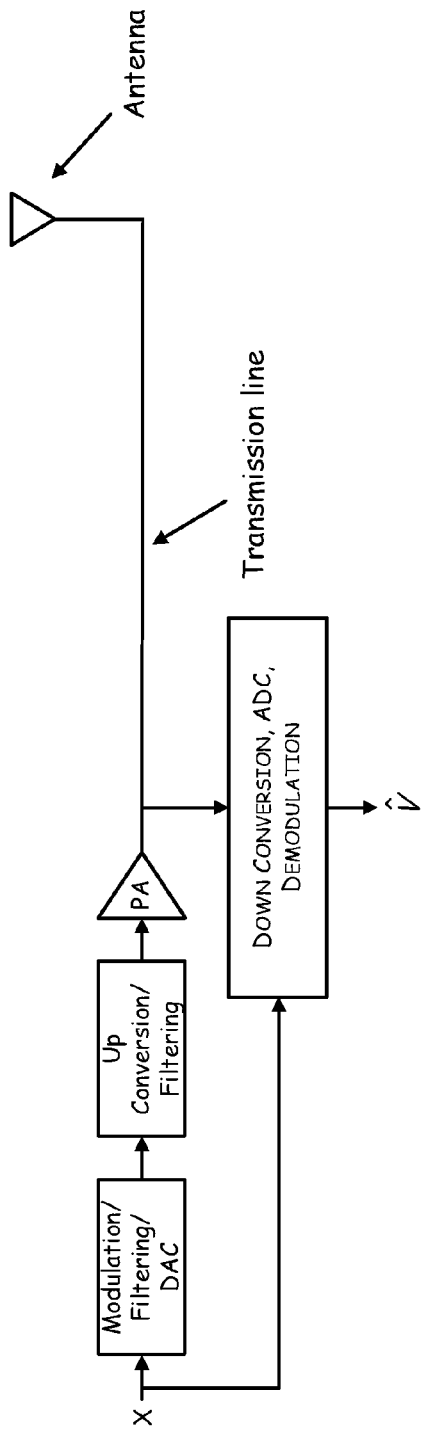
FIG. 5A
FIG. 5B

ANTENNA IMPEDANCE/POWER AMPLIFIER SOURCE IMPEDANCE MEASUREMENT CIRCUITRY AND DEVICE OPERATION BASED THEREON

CROSS-REFERENCE TO PRIORITY APPLICATION

The present application claims priority to U.S. Provisional Application No. 61/187,533, filed Jun. 16, 2009, which is incorporated herein in its entirety for all purposes.

BACKGROUND

1. Technical Field

This invention relates generally to wired and wireless communication systems and more particularly to Radio Frequency power amplifiers and antennas of wireless devices and drivers of wired devices.

2. Related Art

Communication systems support wireless and wire lined communications between wireless and/or wire lined communication devices. Such communication systems range from national and/or international cellular telephone systems to the Internet to point-to-point in-home wireless networks. Communication systems are constructed, and hence operate, in accordance with one or more communication standards. For example, wireless communication systems operate in accordance with one or more standards including, but not limited to, IEEE 802.11x, Bluetooth, wireless wide area networks (e.g., WiMAX), advanced mobile phone services (AMPS), digital AMPS, global system for mobile communications (GSM), North American code division multiple access (CDMA), Wideband CDMA, local multi-point distribution systems (LMDS), multi-channel-multi-point distribution systems (MMDS), radio frequency identification (RFID), Enhanced Data rates for GSM Evolution (EDGE), General Packet Radio Service (GPRS), and many others. Wired communication devices operate according to respective communication standards.

Depending on the type of wireless communication system, a wireless communication device, such as a cellular telephone, two-way radio, personal digital assistant (PDA), personal computer (PC), laptop computer, home entertainment equipment, RFID reader, RFID tag, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system or a particular RF frequency for some systems) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations, and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). The receiver couples to an antenna and includes a low noise amplifier, one or more intermediate frequency stages, a filtering stage, and a data recovery stage. The low noise amplifier receives inbound RF signals via the antenna and amplifies them. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard. As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

Most, if not all wireless communication standards limit transmitted power level. Further, some wireless communication standards include reverse link power control, which allows a remote device to control transmit power of another wireless device, e.g., base station controls reverse link transmit power of hand held devices. Thus, in most if not all wireless devices, the power amplifier and preceding components is actively controlled to thereby control transmit power. Shortcomings exist with respect to the efficiency of the power amplifier. When the power amplifier is matched well with the antenna, efficient transmission results; when these components are mismatched, inefficiency results. Such inefficiency results in excess power drain (by the power amplifier) as well as reduction in transmit power. This mismatch can occur due to operational variations of the antenna, e.g., alteration of load impedance due to antenna configuration/position, as well as operational variations of the power amplifier and other RF signal path components of the wireless device due to temperature fluctuations, voltage supply variations, etc.

Antenna impedance may change based upon position of the wireless device with reference to surrounding structure. For example, when a user of a mobile wireless device picks up the device, antenna impedance as seen by a driving component, e.g., the power amplifier, changes. A change in load impedance as seen by the power amplifier typically causes the device to be less efficient, decreasing transmission efficiency and increasing battery drain. Of course, propagated signal power is also affected by changes in the load impedance, which typically results in decreased wireless communication rates, dropped calls, etc. Similar issues exist in wired communication devices with regard to wired devices and the interconnect that couples the wired communication devices to their respective wired links.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE DRAWINGS

FIG. 4 is a block diagram illustrating a partial structure of a transceiver according to one embodiment of the present invention;

FIG. 5A is a block diagram illustrating a portion of a wireless transmitter of a wireless device constructed according to an embodiment of the present invention;

FIG. 5B is a block diagram illustrating a portion of a wireless transmitter of another wireless device constructed according to an embodiment of the present invention;

DETAILED DESCRIPTION OF THE DRAWINGS

Figure 1:
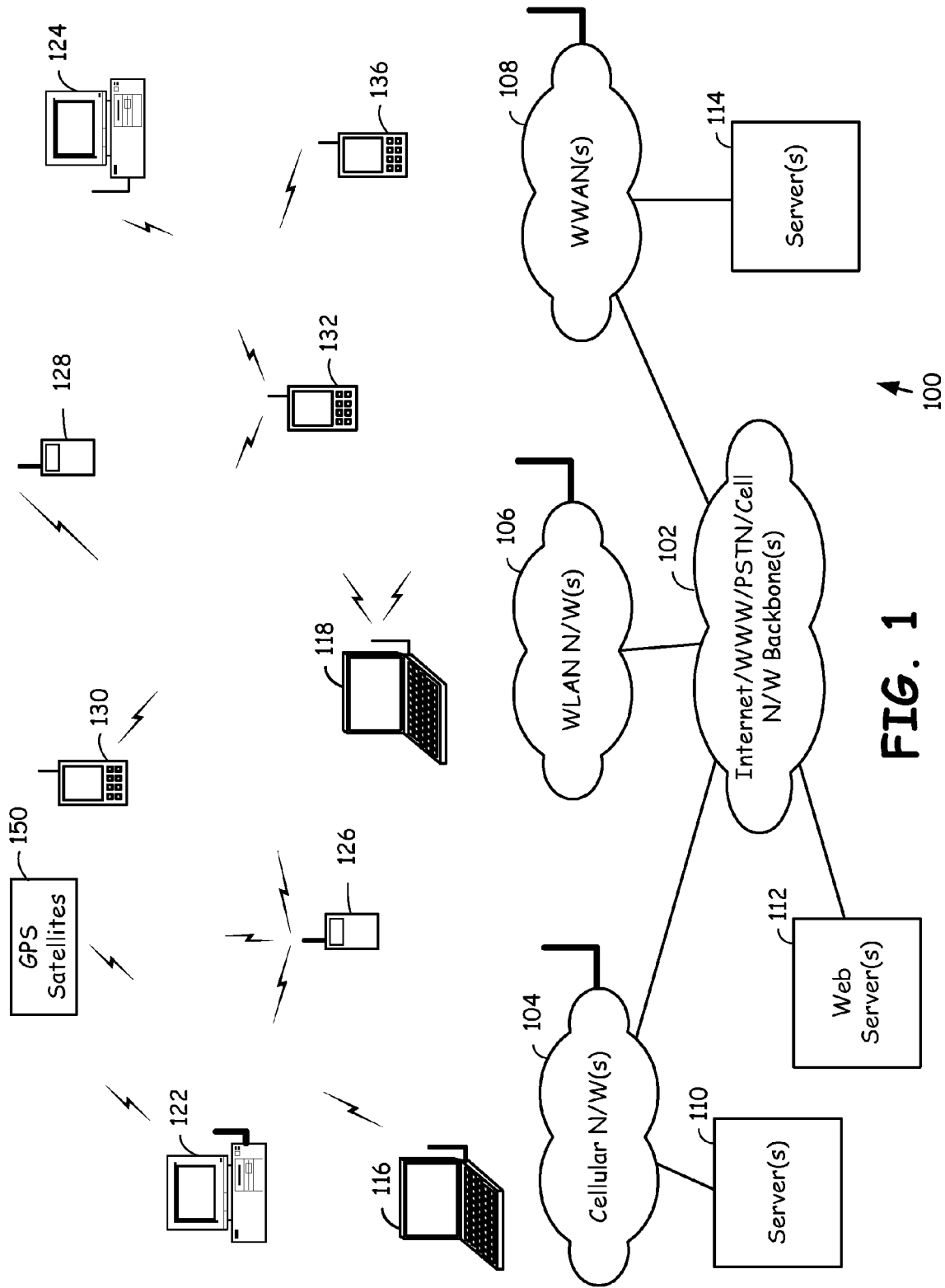
FIG. 1 is a system diagram illustrating a wireless communication system constructed and operating according to one or more embodiments of the present invention.

FIG. 1 is a system diagram illustrating a wireless communication system constructed and operating according to one or more embodiments of the present invention. The wireless communication system 100 of FIG. 1 includes a communication infrastructure and a plurality of wireless devices. The communication infrastructure includes one or more cellular networks 104, one or more wireless local area networks (WLANs) 106, and one or more wireless wide area networks (WWANs) 108. The cellular networks 104, WLANs 106, WWANs 108 all typically couple to one or more backbone networks. The backbone networks 102 may include the Internet, the Worldwide Web, one or more public switched telephone network backbones, one or more cellular network backbones, one or more private network backbones and/or other types of backbones that support communications with the various wireless network infrastructures 104, 106, and 108. Server computers may couple to these various network infrastructures. For example, server computer 110 couples to cellular network 104, web server computer 112 couples to the Internet/WWW/PSTN/Cell network 102, and server computer 114 couples to WWAN network 108. Other server computers and/or other devices may couple to these networks as well in various other constructs.

Each of the cellular networks 104, WLANs 106, and WWANs 108 support wireless communications with wireless devices in various wireless spectra and according to various communication protocol standards. For example, the cellular network 104 may support wireless communications with wireless devices within the 800 MHz band and the 1900 MHz band, and/or other Radio Frequency (RF) bands that are allocated for cellular network communications. The cellular network 104 may support GSM, EDGE, GPRS, 3G, CDMA, TDMA, LTE, and/or various other standardized communications. Of course, these are examples only and should not be considered to limit the spectra or operations used by such cellular networks. The WLANs 106 typically operate within the Industrial, Scientific, and Medical (ISM) bands that include the 2.4 GHz and 5.8 GHz bands. The ISM bands include other frequencies as well that support other types of wireless communications, such bands including the 6.78 MHz, 13.56 MHz, 27.12 MHz, 40.68 MHz, 433.92 MHz, 915 MHz, 24.125 GHz, 61.25 GHz, 122.5 GHz, and 245 GHz bands. The WWANs networks 108 may operate within differing RF spectra based upon that which spectra portion is allocated at any particular locale. Device to device communications may be serviced in one of these frequency bands as well.

The wireless network infrastructures 104, 106, and 108 support communications to and from wireless devices 116, 118, 122, 124, 126, 128, 130, 132, and/or 136. Various types of wireless devices are illustrated. These wireless devices include laptop computers 116 and 118, desktop computers 122 and 124, cellular telephones 126 and 128, portable data terminals 130, 132, and 136. Of course, differing types of devices may be considered wireless devices within the context of the scope of the present invention. For example, automobiles themselves having cellular interfaces would be considered wireless devices according to the present invention. Further, any device having a wireless communications interface either bi-directional or uni-directional, may be considered a wireless device according to the present invention, in various other types of wireless devices. For example, wireless devices may include Global Positioning System (GPS) receiving capability to receive positioning signals from multiple GPS satellites 150.

The wireless devices 116-136 may support peer-to-peer communications as well, such peer-to-peer communications not requiring the support of a wireless network infrastructure. For example, these devices may communicate with each other in a 60 GHz spectrum, may use a peer-to-peer communications within a WLAN spectrum, for example, or may use other types of peer-to-peer communications. For example, within the ISM spectra, wireless devices may communicate according to Bluetooth protocol or any of the various available WLAN protocols supported by IEEE802.11x, for example.

As will be further described with reference to FIGS. 2-8, each of the wireless devices 116-136 illustrated in FIG. 1 includes baseband processing circuitry, Radio Frequency (RF) transceiver, and at least one antenna. According to the present invention, the RF transceiver includes an RF power amplifier constructed and operating according to the present invention.

Still referring to FIG. 1, each of the plurality of wireless devices 116-136 includes the ability to monitor or determine load impedance seen by a power amplifier of the device and/or to determine a source impedance of the power amplifier. As will be described further with reference to the figures herein, the load impedance of an antenna of any of these devices is typically altered based upon the position of the devices with respect to conductive elements, may vary somewhat with temperature, or may vary based upon other operational considerations or characteristics. Thus, according to one aspect of the present invention, each of these devices 116-136 includes circuitry for determining impedance at an output of one or more power amplifiers of the device. Some of these wireless devices 116-136 include multiple antennas. According to some embodiment of the present invention, the load impedance of each antenna of the device as seen by a corresponding power amplifier(s) may be determined. Structure for such impedance measurement will be described further herein with reference to FIGS. 2-11. Operations consistent with such structures are described herein with reference to FIGS. 12-18.

Figure 19:
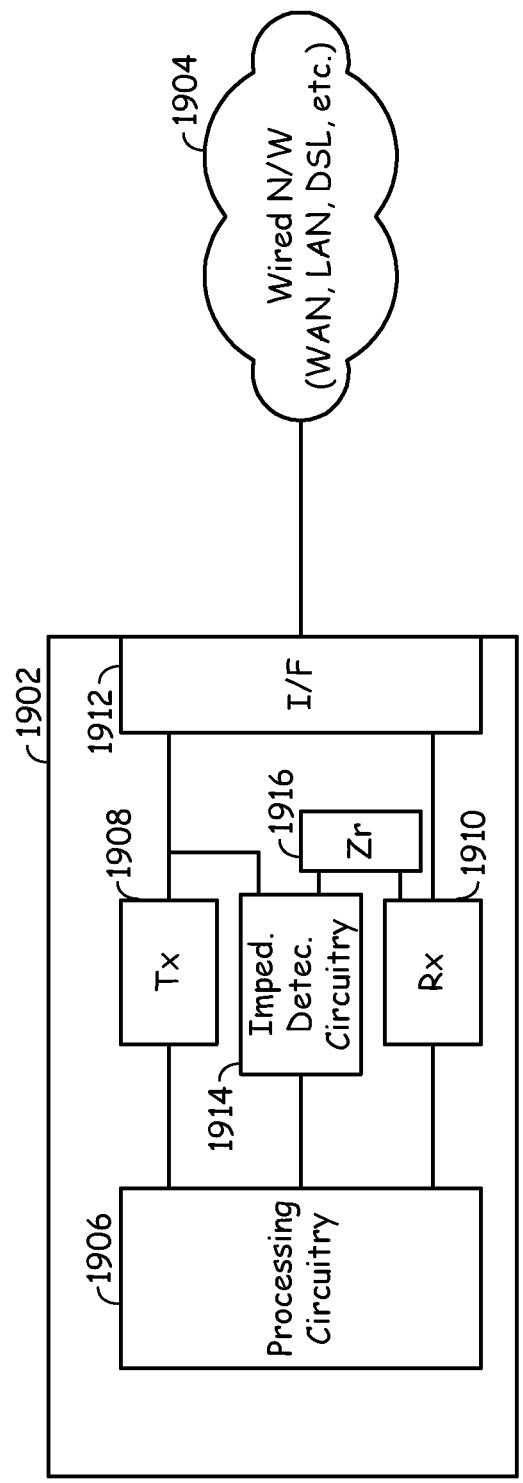
FIG. 19 is a block diagram illustrating a wired communication device constructed according to one or more embodiments of the present invention

Wired communication devices, such as communication interfaces of server computers 110, 112, 114 and portions of the networks 104, 106, and 108 may also embody teachings of the present invention. In such cases, amplifiers of such devices that amplify signals for transmission may include impedance determination circuitry. FIG. 19 illustrates a wired communication device having such impedance detection or measurement circuitry. The operation of such devices is described with reference to FIG. 20. Stated simply, the teachings described herein relating to wireless devices may be applied to wired devices and the scope of the present invention, is not limited by wireless or wired communications, and may be applied to all types of communications.

Figure 2:
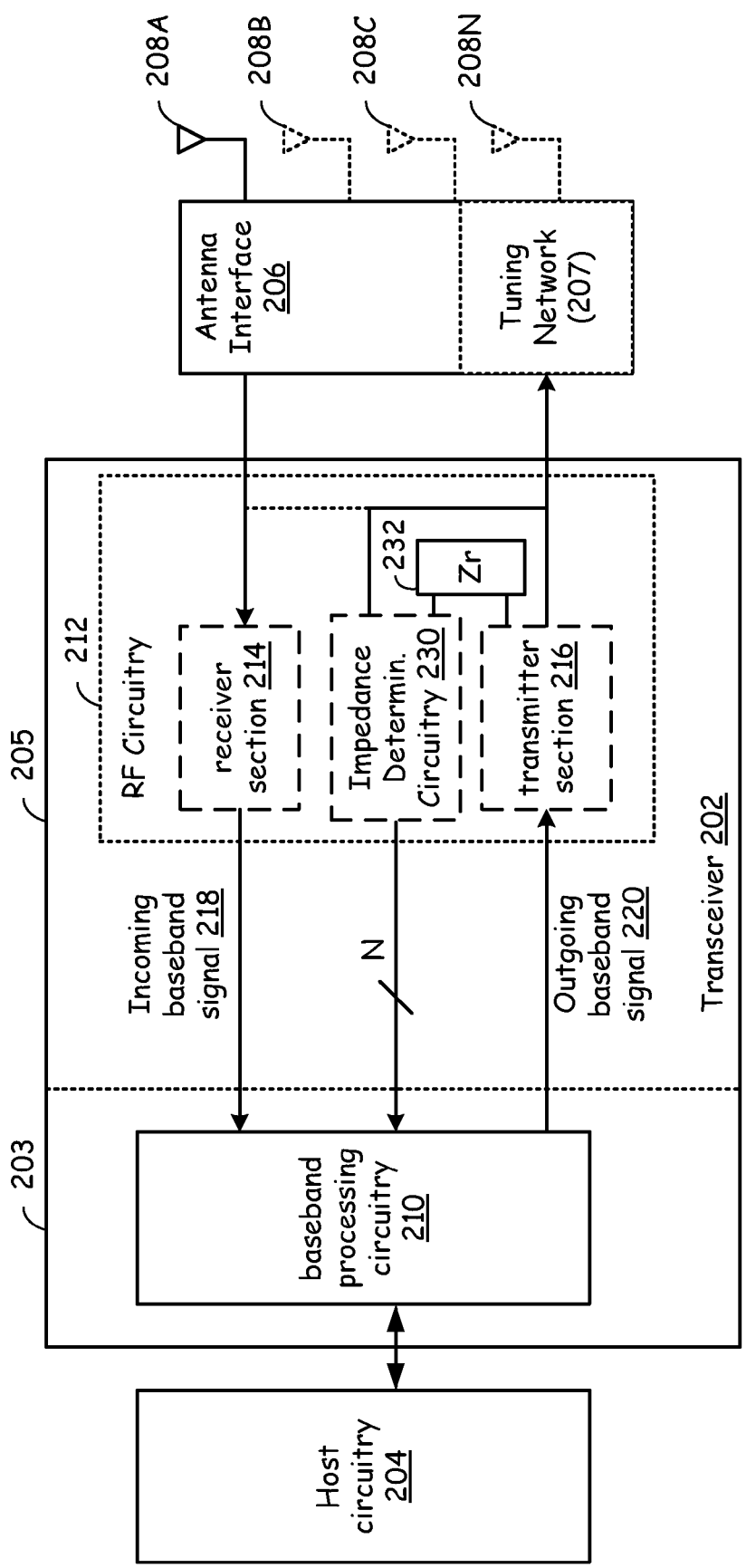
FIG. 2 is a block diagram illustrating components of a wireless device constructed and operating according to one or more embodiments of the present invention.

FIG. 2 is a block diagram illustrating components of a wireless device constructed and operating according to one or more embodiments of the present invention. The wireless device includes host circuitry 204, RF transceiver 202, antenna interface 206, and a plurality of antenna elements 208A, 208B, 208C, and 208N. In some embodiments of the wireless device of FIG. 2, the antenna may include only a single antenna element. However, as shown, in FIG. 2, the antenna may have a plurality of antenna elements 208A-208N that are configurable by the antenna interface 206. Configurability via antenna interface 206 may include operation with directionality, MIMO, or other multiple antenna configurations.

Host circuitry 204 may include processing circuitry, memory, user interfaces, wired interfaces, and/or other circuitry associated with the wireless device. For example, wireless devices typically have a display, a keyboard, and/or multiple other user interface devices. Further, the wireless device includes one or more batteries for powering the wireless device. The RF transceiver 202 includes baseband processing circuitry 210 and RF circuitry 212. The baseband processing circuitry 210 produces an outgoing baseband signal 220 to a transmitter section 216 of the RF circuitry 212. Receiver section 214 of the RF circuitry 212 produces an incoming baseband signal 218 to the baseband processing circuitry 210. RF circuitry 212 produces an outgoing RF signal from transmitter section 216 to antenna interface 206. The antenna interface 206 couples the outgoing RF signal to one or more of the plurality of antenna elements 208A-208N. Receiver section 214 of RF circuitry 212 receives an incoming RF signal from antenna interface 206 and converts the incoming RF signal to the incoming baseband signal 218. Likewise, the transmitter section 216 converts the outgoing baseband signal 220 to the outgoing RF signal which the transmitter section 216 produces to antenna interface 206.

According to the present invention, the transmitter section includes at least one RF power amplifier that can operate at multiple battery voltages. The RF power amplifier has a cascode structure in some embodiments and has cascode bias feedback circuitry that provides at least one bias voltage to a cascode stage of the amplifier.

As is further shown in FIG. 2, RF circuitry 212 includes not only receiver section 214 and transmitter section 216 but also includes impedance determination circuitry 230. The impedance determination circuitry in some embodiments is distinct from the receiver section 214 and transmitter section 216. However, in some embodiments, the receiver section 214 may serve as a portion of the impedance determination circuitry as well. Assuming that the transceiver 202 has dedicated impedance determination circuitry 230, the impedance determination circuitry 230 couples to an output of the transmitter section 216. The impedance determination circuitry 230 is able to determine load impedance of the antenna interface 206 as seen by the transmitter section. The load impedance of antenna interface 206 is based upon a connectivity of the various antenna elements 208A, 208B, 208C, and 208N and other characteristics. When the antenna interface includes tuning network 207, the load impedance of the antenna interface 206 is further based upon a current state of the tuning network. Tuning network 207 includes a plurality of lumped elements and switches that are switchable to adjust the load impedance of antenna interface 206 as seen by transmitter section 216. Further, tuning network 207 may be altered to adjust the output impedance of antenna interface 206 as seen by receiver section 214.

The RF circuitry 212 of the transceiver 202 may further include one or more reference impedance(s) 232. The reference impedance 232 may be used for calibration operations of the load impedance determination circuitry 230 and/or to determine a source impedance of a power amplifier of transmitter section 216. The reference impedance 232 may be formed in one or more combination of the semi conductive substrates of the transceiver 202, in one or more metal layers of the transceiver 202, and/or in a combination of these.

The transceiver 202 may be formed on a single integrated circuit or may be formed in multiple integrated circuits 203 and 205. In either case, an N bit wide interface exists between impedance determination circuitry 230 and baseband processing circuitry 210. In such case, the impedance determination circuitry 230 can communicate a detected or determined impedance to baseband processing circuitry 210. The baseband processing circuitry 210 uses the information received by impedance determination circuitry 230 to monitor operation of the transceiver 202 and/or to adjust the operation of transceiver 202. Further, in other embodiments, the baseband processing circuitry 210, based upon information received from impedance determination circuitry 230, may report such information to host circuitry 204. In response thereto, the host circuitry 204 may provide information based upon such determined impedance and/or adjust operations of other components of the wireless device. The baseband processing circuitry may further alter the characteristics of the outgoing baseband signal 220 to compensate for load mismatches between the transceiver 202 and the antenna interface 206/antennas.

In various operations that are described further herein, once the impedance determination circuitry 230 determines the load impedance at antenna interface 206, baseband processing circuitry 210 may adjust operations of receiver section 214, transmitter section 216 and may adjust the tuning network 207. Further, the baseband processing circuitry 210 may perform antenna diversity selection operations, multi-input-multi-output (MIMO) tuning or spatial selection operations based upon such input. These operations will be further described herein with reference to the subsequent figures.

Figure 3:
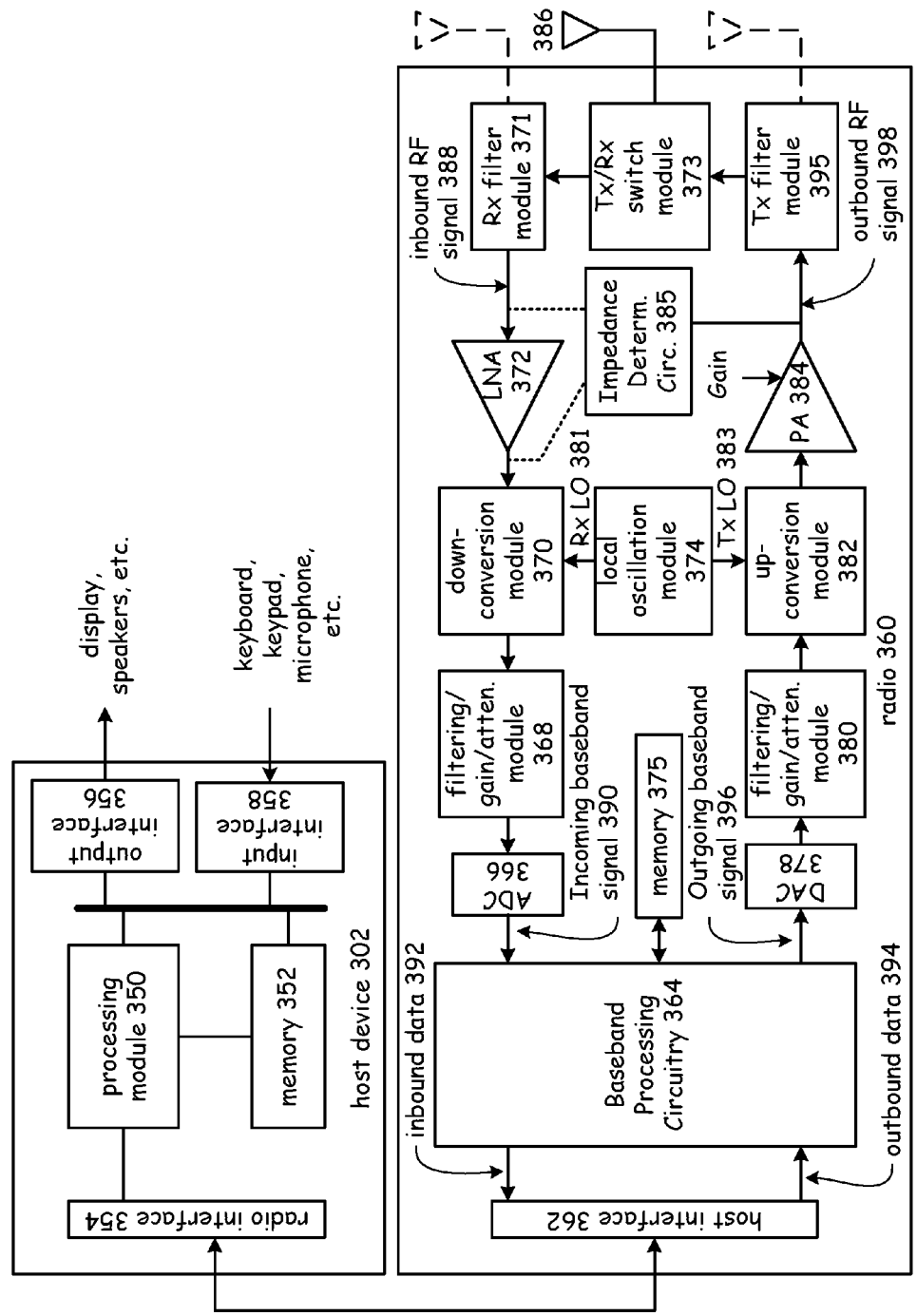
FIG. 3 is a schematic block diagram illustrating a wireless communication device that includes a host device and an associated radio.

FIG. 3 is a schematic block diagram illustrating a wireless communication device that includes a host device and an associated radio. For cellular telephone hosts, the radio 360 is a built-in component. For personal digital assistants hosts, laptop hosts, and/or personal computer hosts, the radio 360 may be built-in or may be an externally coupled component that couples to the host device 302 via a communication link, e.g., PCI interface, PCMCIA interface, USB interface, or another type of interface.

As illustrated, the host device 302 includes a processing module 350, memory 352, radio interface 354, input interface 358, and output interface 356. The processing module 350 and memory 352 execute corresponding instructions that are typically performed by the host device. For example, for a cellular telephone host device, the processing module 350 performs the corresponding communication functions in accordance with a particular cellular telephone standard.

The radio interface 354 allows data to be received from and sent to the radio 360. For data received from the radio 360 (e.g., inbound data), the radio interface 354 provides the data to the processing module 350 for further processing and/or routing to the output interface 356. The output interface 356 provides connectivity to an output display device such as a display, monitor, speakers, et cetera, to display received data. The radio interface 354 also provides data from the processing module 350 to the radio 360. The processing module 350 may receive the outbound data from an input device such as a keyboard, keypad, microphone, et cetera via the input interface 358 or generate the data itself. For data received via the input interface 358, the processing module 350 may perform a corresponding host function on the data and/or route it to the radio 360 via the radio interface 354.

Radio 360 includes a host interface 362, baseband processing circuitry/baseband processing module 364, an analog-to-digital converter (ADC) 366, a filtering/gain/attenuation module 368, an IF mixing down conversion stage 370, a receiver filter 371, a low noise amplifier (LNA) 372, a transmitter/receiver switch 373, a local oscillation module 374, memory 375, a digital-to-analog converter (DAC) 378, a filtering/gain/attenuation module 380, an IF mixing up conversion stage 382, a power amplifier (PA) 384, a transmitter filter module 385, and one or more antennas 386. The antenna 386 may be a single antenna that is shared by the transmit and receive paths as regulated by the Tx/Rx switch 373, or may include separate antennas for the transmit path and receive path. The antenna implementation will depend on the particular standard to which the wireless communication device is compliant and the particular design of the device.

The baseband processing circuitry 364, in combination with operational instructions stored in memory 375, executes digital receiver functions and digital transmitter functions. The digital receiver functions include, but are not limited to, digital intermediate frequency to baseband conversion, demodulation, constellation demapping, decoding, and/or descrambling. The digital transmitter functions include, but are not limited to, scrambling, encoding, constellation mapping, modulation, and/or digital baseband to IF conversion. The baseband processing circuitry 364 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 375 may be a single memory device or a plurality of memory devices. Such a memory device may be a read-only memory, random access memory, volatile memory, non-volatile memory, static memory, dynamic memory, flash memory, and/or any device that stores digital information. Note that when the baseband processing circuitry 364 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. The memory 375 stores, and the baseband processing circuitry 364 executes, operational instructions that facilitate functionality of the device.

In operation, the radio 360 receives outbound data 394 from the host device via the host interface 362. The host interface 362 routes the outbound data 394 to the baseband processing circuitry 364, which processes the outbound data 394 in accordance with a particular wireless communication standard (e.g., Cellular, WiMAX, IEEE802.11a, IEEE802.11b, IEEE802.11g, IEEE802.11n, Bluetooth, et cetera) to produce digital transmission formatted data/outgoing baseband signal 396. The digital transmission formatted data 396 will be a digital base-band signal or a digital low IF signal, where the low IF typically will be in the frequency range of one hundred kilohertz to a few megahertz.

The digital-to-analog converter 378 converts the digital transmission formatted data 396 from the digital domain to the analog domain. The filtering/gain/attenuation module 380 filters and/or adjusts the gain of the analog signal prior to providing it to the IF mixing stage 382. The IF mixing stage 382 directly or via multiple conversion steps (super heterodyne) converts the analog baseband or low IF signal into an RF signal based on a transmitter local oscillation 383 provided by local oscillation module 374. The power amplifier (PA) 384 amplifies the RF signal to produce outbound RF signal 398, which is filtered by the transmitter filter module 385. The antenna 386 transmits the outbound RF signal 398 to a targeted device such as a base station, an access point, and/or another wireless communication device.

The radio 360 also receives an inbound RF signal 388 via the antenna 386, which was transmitted by a base station, an access point, or another wireless communication device. The antenna 386 provides the inbound RF signal 388 to the receiver filter module 371 via the Tx/Rx switch 373, where the Rx filter 371 band pass filters the inbound RF signal 388. The Rx filter 371 provides the filtered RF signal to low noise amplifier (LNA) 372, which amplifies the signal 388 to produce an amplified inbound RF signal. The low noise amplifier 372 provides the amplified inbound RF signal to the IF mixing module 370, which directly converts the amplified inbound RF signal into an inbound low IF signal or baseband signal based on a receiver local oscillation 381 provided by local oscillation module 374. The down conversion module 370 provides the inbound low IF signal or baseband signal to the filtering/gain/attenuation module 368. The filtering/gain/attenuation module 368 may be implemented in accordance with the teachings of the present invention to filter and/or attenuate the inbound low IF signal or the inbound baseband signal to produce a filtered inbound signal.

The analog-to-digital converter 366 converts the filtered inbound signal from the analog domain to the digital domain to produce digital reception formatted data/incoming baseband signal 390. The baseband processing circuitry 364 decodes, descrambles, demaps, and/or demodulates the digital reception formatted data 390 to recapture inbound data 392 in accordance with the particular wireless communication standard being implemented by radio 360. The host interface 362 provides the recaptured inbound data 392 to the host device 18-32 via the radio interface 354.

As one of average skill in the art will appreciate, the wireless communication device of FIG. 3 may be implemented using one or more integrated circuits. For example, the host device may be implemented on one integrated circuit, the baseband processing circuitry 364, and memory 375 may be implemented on a second integrated circuit, and the remaining components of the radio 360, less the antenna(s) 386, may be implemented on a third integrated circuit. As an alternate example, the radio 360 may be implemented on a single integrated circuit. As yet another example, the processing module 350 of the host device and the baseband processing circuitry 364 may be a common processing device implemented on a single integrated circuit. Further, the memory 352 and memory 375 may be implemented on a single integrated circuit and/or on the same integrated circuit as the common processing modules of processing module 350 and the baseband processing circuitry 364.

Still referring to FIG. 3, impedance determination circuitry 385 couples to an output of power amp 384, may couple to an output of Rx filter module 371, and/or may couple to an output of LNA 372. The impedance determination circuitry 385 also couples to baseband processing circuitry 364 although such coupling is not shown explicitly in FIG. 3. In its operations, the impedance determination circuitry 385 periodically measures the load impedance seen by PA 384 at the Tx filter module 395, may continually monitor such impedance, or may perform a combination of periodically and continually monitoring impedance at the output of PA 384. The structure of FIG. 3 may be slightly different in differing embodiments. For example, in other embodiments, the Rx filter module 371, the Tx/Rx switch module 373, and the Tx filter module 395 may be off-chip. Further, the Rx filter module 371 and Tx filter module 395 may be tunable to adjust the load impedance as seen by the PA 384 and/or the output impedance as seen by LNA 372. According to various aspects of the present invention, the characteristics of the Rx filter module 371, Tx filter module 395, and Tx/Rx switch module 373 may be altered based upon the load impedance as seen by impedance determination circuitry 385 at the output of PA 384.

The baseband processing circuitry 364 may pre-distort outgoing baseband signal 396 based upon information received from impedance determination circuitry 385. In such case, this pre-distortion may overcome minor non-linearity of the operation of PA 384 and mismatch of load impedance as seen by PA 384. Thus, according to the present invention, the baseband processing circuitry 364, by altering the outgoing baseband signal 396 may partially/fully overcome a mismatch of impedance as seen by PA 384.

In some embodiments of the present invention, the impedance determination circuitry is dedicated circuitry. The impedance determination circuitry may determine load impedance at an output of PA 384 by using Vector Network Analysis (VNA) to determine the load impedance. Such determination of load impedance at an output of the PA 384 may be done during preamble packet operations and/or during data packet operations. Determination of load impedance at an output of the PA 384 may be done for a single tone or for multiple tones.

FIG. 4 is a block diagram illustrating a partial structure of a transceiver according to one aspect of the present invention. The transceiver includes RF front end section 402 and baseband processing section 404. These sections 402 and 404 may reside on a single integrated circuit or may reside on multiple integrated circuits. The baseband processing section 404 includes baseband processing circuitry 406 that produces baseband output signals to Tx path components 408A, 408B, 408C, and 408D. Of course, the structure illustrated in FIG. 4 is a subsection of a transceiver that services wireless communications according to various aspects of the present invention. A device having additional components may have structures similar to those described in FIGS. 2 and 3.

The structure of FIG. 4 is one that includes multiple antennas 412A, 412B, 412C, and 412D. The structure of FIG. 4 may service MIMO communications or simply antenna diversity operations. Using the structure of FIG. 4, beam forming may be employed even when a single-input-single-output stream is serviced. Each of the Tx path components 408A, 408B, 408C, and 408D receives and processes respective baseband communication signals to produce RF signals to PA 410A, 410B, 410C, and 410D, respectively. Each of the PAs 410A, 410B, 410C, and 410D amplifies a respective RF signal input thereto and outputs to respective antennas 412A, 412B, 412C, and 412D.

According to the present invention, impedance determination circuitry 414 is operable to determine load impedance seen at the output of each PAs 410A, 410B, 410C, and 410D. Such load impedance, in some embodiments, is the load impedance seen by each of the PAs 410A, 410B, 410C, and 410D at the edge of IC 402. The impedance determination circuitry 414 may monitor separately the load impedance as seen by PAs 410A, 410B, 410C, and 410D. However, in another embodiment, the impedance determination circuitry 414 is able to continually monitor each of the impedances seen at the outputs of PA 410A, 410B, 410C, and 410D. The impedance determination circuitry 414 provides an output to baseband processing circuitry 406 that receives such information and that may adjust operation of the transceiver accordingly. Further, in other embodiments, the information produced by impedance determination circuitry 414 may be further employed by differing processing components of a device containing the transceiver of FIG. 4 and may operate such device accordingly.

The impedance determination circuitry 414 may also be employed to determine the source impedance of each of the plurality of PAs 410A, 410B, 410C, and/or 410D. The source impedance of the PAs 410A, 410B, 410C, and/or 410D may change over time, typically based upon temperature fluctuations, other operational variations, and/or process variations. Once determined, knowledge of such source impedance(s) may be employed to alter operation of the device.

FIG. 5A is a block diagram illustrating a portion of a wireless transmitter of a wireless device constructed according to an embodiment of the present invention. Illustrated in FIG. 5A is an antenna coupled via a transmission line to the output of a PA. Impedance of the antenna may be characterized as $Z_A$ while the characteristic impedance of the transmission line is $Z_o$. The circuit model represented in FIG. 5A is representative of most, if not all, wireless devices. When the antenna impedance $Z_A$ is not equal to the characteristic impedance $Z_o$ of the circuit/transmission line, then the power delivered into the antenna may be higher or lower than the (target) power delivered into a matched antenna with impedance $Z_o$. When the power delivered into the antenna is lower than the target power (corresponding to a matched antenna with impedance $Z_o$), then the performance (e.g. SNR, PER, QoS) of the data link is degraded. When the power delivered into the antenna is higher than the target power, then power consumption and/or transmitter distortion increase. Therefore, it is desirable that the power delivered into the antenna closely matches the target power.

Embodiments constructed according to the present invention estimate/determine load impedance of the transmission line/antenna combination as seen by the PA. Such operations may be performed during design, during testing, during performance validation, during operation of the device, or some or all of these. Operation of structures of the present invention may detect mismatched antenna impedance, i.e., $Z_A \neq Z_o$. Example scenarios resulting in a mismatched antenna impedance are based upon the influence of temperature during operation, device/user proximity to the antenna structure, antenna manufacturing tolerances, poorly connected or disconnected antenna (typically resulting in high antenna impedance), and shorted antenna cable (typically low antenna impedance).

When a transmission line with a characteristic impedance $Z_o$ is terminated with a load impedance $Z_L \neq Z_o$, then a reflected voltage and current wave (Voltage Standing Wave, "VSW" having a Voltage Standing Wave Ratio "VSWR") is present on the transmission line. The total voltage (and current) on the transmission line is the sum of incident and reflected voltage (current) wave, resulting in a standing wave along the transmission line. In the following discussion the "load" is assumed to be an antenna (i.e. $Z_L = Z_A$). However, the load may alternatively be a measurement device such as a power meter, spectrum analyzer, signal analyzer, loadpull, etc. Embodiments of the present invention instantiate a voltage detector (or, equivalently, impedance detector) in the transmit path as described below. Further described below indicates how the output of the voltage/impedance detector is used to estimate the antenna impedance and the power delivered into the antenna.

A voltage detector of FIG. 5A (also referred to as impedance determination circuitry) is located along the transmission line between the PA output and an antenna port. In FIG. 5A, the voltage detector is implemented using a frequency down-converter (e.g. I/Q mixer) and de-modulator (e.g. DFT) to obtain the measurement $\hat{V}$. $\hat{V}$ is an estimate of the complex baseband voltage V. Typically, $\hat{V}$ is a scaled version of V:

$\hat{V} = \kappa_1 \cdot V$, where $\kappa_1$ is a complex factor.

FIG. 5B is a block diagram illustrating a portion of a wireless transmitter of another wireless device constructed according to an embodiment of the present invention. In FIG. 5B, the voltage detector is implemented using a frequency down-converter (e.g. single mixer) and correlator to obtain the measurement $\tilde{V}$. $\tilde{V}$ is again an estimate of the complex baseband voltage V. Typically, $\tilde{V}$ is a scaled version of V:

$\tilde{V} = \kappa_2 \cdot V$, where $\kappa_2$ is a complex factor.

The output $\hat{V}$ or $\tilde{V}$ of the voltage detector is used to estimate the antenna impedance $Z_A$ and the power $P_A$ delivered into the antenna, as described below. The voltage detector is equivalent to an impedance detector. The voltage detector functionally operates as a Vector Network Analyzer (VNA). The voltage (impedance) detector shown in FIGS. 5A and 5B may be implemented either on-chip or off-chip. The voltage (impedance) measurement may be performed once (e.g., at start-up) or periodically (e.g. on every transmit frame). The transmit signal used to measure the voltage (impedance) may be an arbitrary, proprietary transmit signal (e.g. a single tone) or a standard compliant TX signal (e.g. preamble or data portion of TX frame).

Figure 6:
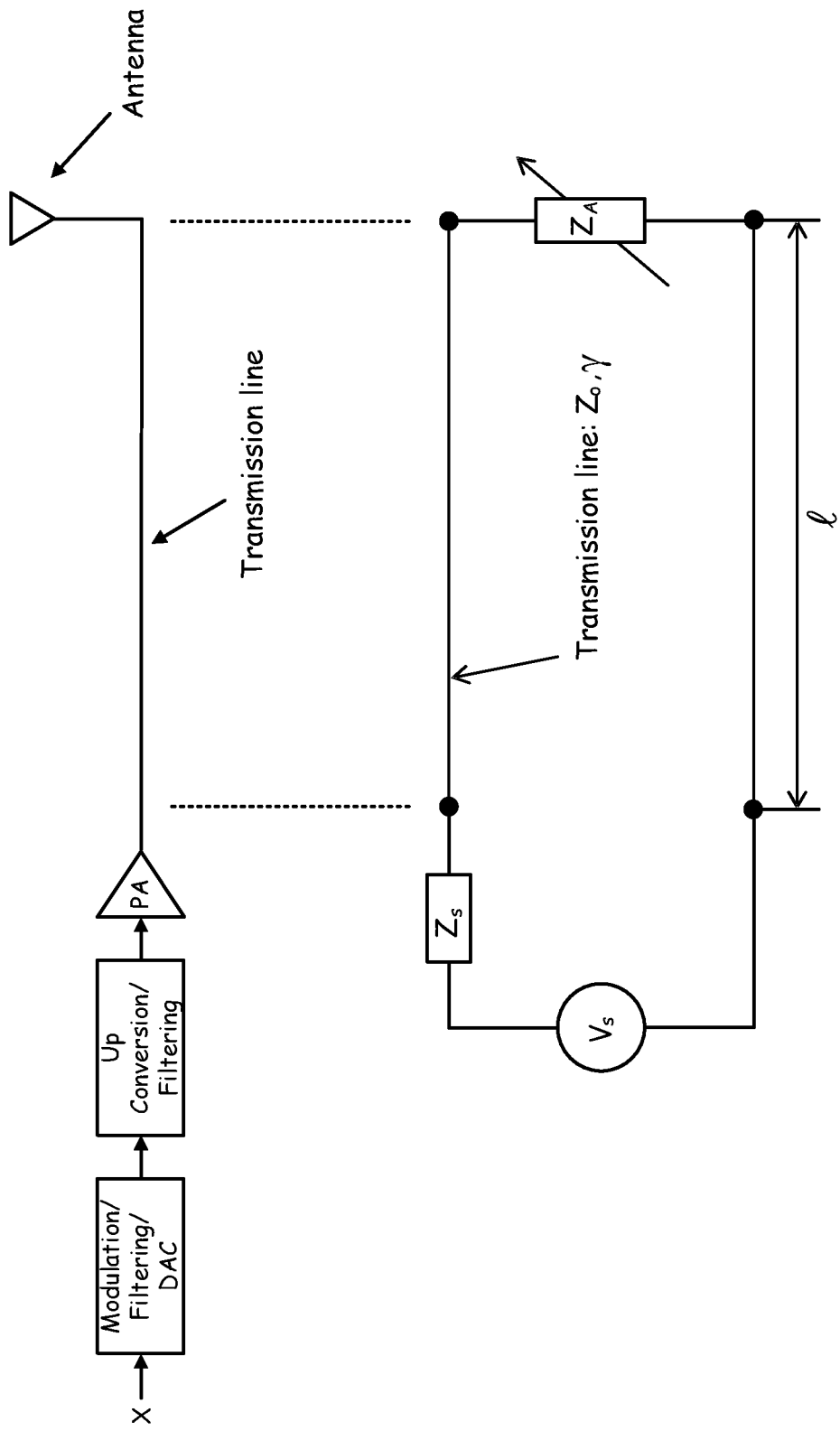
FIG. 6 is a block diagram illustrating the equivalent circuit of a portion of a transmitter section of a wireless device constructed according to and/or operating according to an embodiment of the present invention.

FIG. 6 is a block diagram illustrating the equivalent circuit of a portion of a transmitter section of a wireless device constructed according to and/or operating according to an embodiment of the present invention. In particular, FIG. 6 illustrates a circuit and transmission line model of the transmit path in FIGS. 5A and 5B. In FIG. 6, $V_S$ denotes the equivalent (complex baseband) source voltage, $Z_S$ denotes the equivalent (complex baseband) source impedance, $\gamma$ denotes the propagation constant, and l denotes the length of the transmission line.

Figure 7:
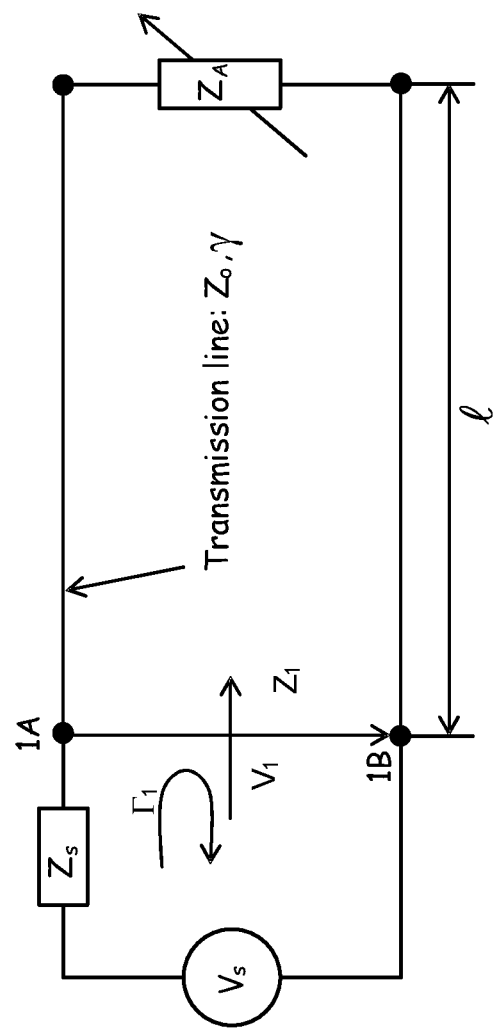
FIG. 7 is a block diagram illustrating the equivalent circuit of a portion of a transmitter section of a wireless device constructed according to and/or operating according to an embodiment of the present invention.

FIG. 7 is a block diagram illustrating the equivalent circuit of a portion of a transmitter section of a wireless device constructed according to and/or operating according to an embodiment of the present invention. Referring now to FIG. 7, the input voltage at terminals 1A-1B is denoted as $V_1$ and satisfies equation (1.1):

$$V_1 = V_S \cdot \frac{Z_1}{Z_1 + Z_S} \quad (1.1)$$

where $V_S$ again denotes the source voltage and $Z_S$ denotes the source impedance. The load impedance at terminals 1A-1B is denoted as $Z_1$ and satisfies equation (1.2):

$$Z_1 = Z_o \cdot \frac{1 + \Gamma_1}{1 - \Gamma_1} \quad (1.2)$$

where $Z_o$ again denotes the characteristic impedance. The reflection coefficient at terminals 1A-1B is denoted as $\Gamma_1$ and satisfies equation (1.3):

$$\Gamma_1 = \Gamma_A \cdot e^{-2\gamma l} \quad (1.3)$$

where $\gamma$ again denotes the propagation constant and l denotes the length of the transmission line. The reflection coefficient at the antenna is denoted as $\Gamma_A$ and satisfies equations (1.4a) and (1.4b):

$$\Gamma_A = \frac{Z_A - Z_o}{Z_A + Z_o} \quad (1.4a)$$

$$Z_A = Z_o \cdot \frac{1 + \Gamma_A}{1 - \Gamma_A} \quad (1.4b)$$

where $Z_A$ again denotes the antenna impedance. The parameters $V_S$, $Z_S$, $\gamma$, and l are dictated by the chip/board design and can be obtained through measurement. As an example, a vector network analyzer can be used to measure the S11 parameter into terminals 1A-1B to determine the source impedance $Z_S$. The source voltage $V_S$ can be obtained by fixing the transmit signal $X = X_0$ and using a known reference impedance across terminals 1A-1B: For example, when the antenna port is terminated with the characteristic impedance $Z_A=Z_o$, then it follows from equations (1.2)-(1.4) that the load impedance $Z_1=Z_o$. From equation (1.1), $$V_S = V_1^{(Z_o)} \cdot \frac{Z_o + Z_S}{Z_o}$$

where $V_1^{(Z_o)}$ is the (known) output of the voltage detector corresponding to the termination $Z_A=Z_o$. Other commonly used termination impedances to determine $V_S$ from equations (1.1)-(1.5) are $Z_A=\infty$ (i.e. open circuit) and $Z_A=0$ (i.e. short circuit). The voltage (impedance) detector of FIG. 6 provides an estimate of the input voltage $V_1$ shown in FIG. 7. With $V_1$, the load impedance $Z_1$ is obtained from equation (1.1):

$$Z_1 = \frac{Z_S}{\frac{V_S}{V_1} - 1} \quad (1.5)$$

The antenna impedance $Z_A$ is then obtained by using equations (1.2)-(1.4). The power delivered into terminals 1A-1B is given by equation (2.1):

$$P = \frac{1}{2} \cdot \Re(V_1 \cdot I_1^*) = \frac{1}{2} \cdot |V_1|^2 \cdot \Re\left(\frac{1}{Z_1^*}\right) \quad (2.1)$$

where $\Re(x)$ denotes the real part of x. For a lossless transmission line (i.e. $\gamma=\alpha+j\beta=j\beta$, with $\alpha=0$), the power P delivered into terminals 1A-1B is equal to the power $P_A$ delivered into the antenna, hence:

$$P_A = \frac{1}{2} \cdot |V_1|^2 \cdot \Re\left(\frac{1}{Z_1^*}\right) \quad (2.2)$$

For a lossy transmission line, the power $P_A$ delivered into the antenna is equal to the power delivered into terminals 1A-1B minus the power dissipated in the transmission line:

$$P_A = \frac{1}{2} \cdot |V_A|^2 \cdot \Re\left(\frac{1}{Z_A^*}\right) \quad (2.3)$$

where $V_A$ is the voltage at the antenna port:

$$V_A = \frac{V_1}{e^{\gamma l} + \Gamma_A e^{-\gamma l}} \cdot (1 + \Gamma_A) \quad (2.4)$$

Using the estimated power delivered into the antenna ($P_A$) according to equations (2.1)-(2.4), the transmit signal (or transmit gain) can be adjusted in order to achieve the target power $P_A=P_{target}$.

Let $X \to X_{target}$ such that $P_A \to P_{target}$

These derivations can be extended to a more complex front end architecture.

Figure 8:
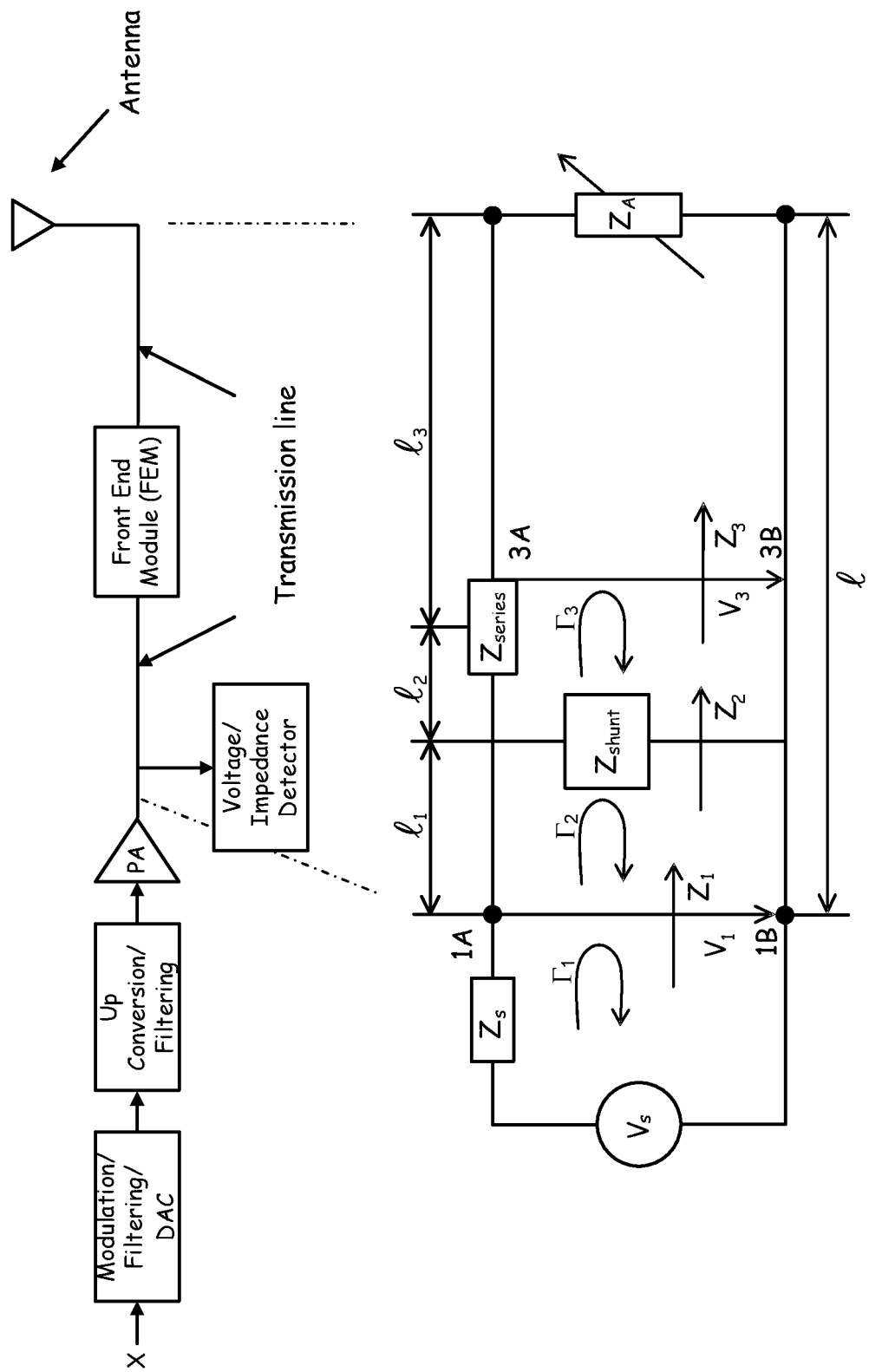
FIG. 8 is a block diagram illustrating an equivalent circuit of a transmitter section of a wireless device coupled to an antenna via a matching network consisting of shunt and series impedance and a transmission line constructed according to one or more embodiments of the present invention.

FIG. 8 is a block diagram illustrating an equivalent circuit of a transmitter section of a wireless device coupled to an antenna via a matching network consisting of shunt and series impedance and a transmission line constructed according to one or more embodiments of the present invention. FIG. 8 shows a simplified transmitter block diagram with a front end module (FEM) present at the output of the PA and a circuit and transmission line model of the transmit path. Similar to the equations and derivation described above, the antenna impedance $Z_A$ can be determined from the output of the voltage (impedance) detector as follows:

$$V_1 = V_S \cdot \frac{Z_1}{Z_1 + Z_S}$$

With equations (1.2) and (1.3):

$$Z_1 = Z_o \frac{1 + \Gamma_2 e^{-2\gamma l_1}}{1 - \Gamma_2 e^{-2\gamma l_1}}$$

Where the reflection $\Gamma_2$ coefficient is given by:

$$\Gamma_2 = \frac{Z_2 - Z_o}{Z_2 + Z_o}$$

In turn, $Z_2$ is calculated using equations (1.2) and (1.3):

$$Z_2 = Z_{shunt} \| Z_o \frac{1 + \Gamma_{series+3} e^{-2\gamma l_2}}{1 - \Gamma_{series+3} e^{-2\gamma l_2}},$$

where "x∥y" denotes "x in parallel with y"

$$\Gamma_{series+3} = Z_o \cdot \frac{Z_{series+3} - Z_o}{Z_{series+3} + Z_o}$$

$$Z_{series+3} = Z_{series} + Z_3$$

$$Z_3 = Z_o \cdot \frac{1 + \Gamma_3}{1 - \Gamma_3}$$

$$\Gamma_3 = \Gamma_A \cdot e^{-2\gamma l_3}$$

and finally:

$$\Gamma_A = \frac{Z_A - Z_o}{Z_A + Z_o}$$

For a lossless transmission line (i.e. $\gamma=\alpha+j\beta=j\beta$, with $\alpha=0$), the power P delivered into terminals 3A-3B is equal to the power $P_A$ delivered into the antenna, hence:

$$P_A = \frac{1}{2} \cdot |V_3|^2 \cdot \Re\left(\frac{1}{Z_3^*}\right)$$

For a lossy transmission line, the power $P_A$ delivered into the antenna is equal to the power delivered into terminals 3A-3B minus the power dissipated in the transmission line:

$$P_A = \frac{1}{2} \cdot |V_A|^2 \cdot \Re\left(\frac{1}{Z_A^*}\right)$$

where $V_A$ is again the voltage at the antenna port.

Figure 9:
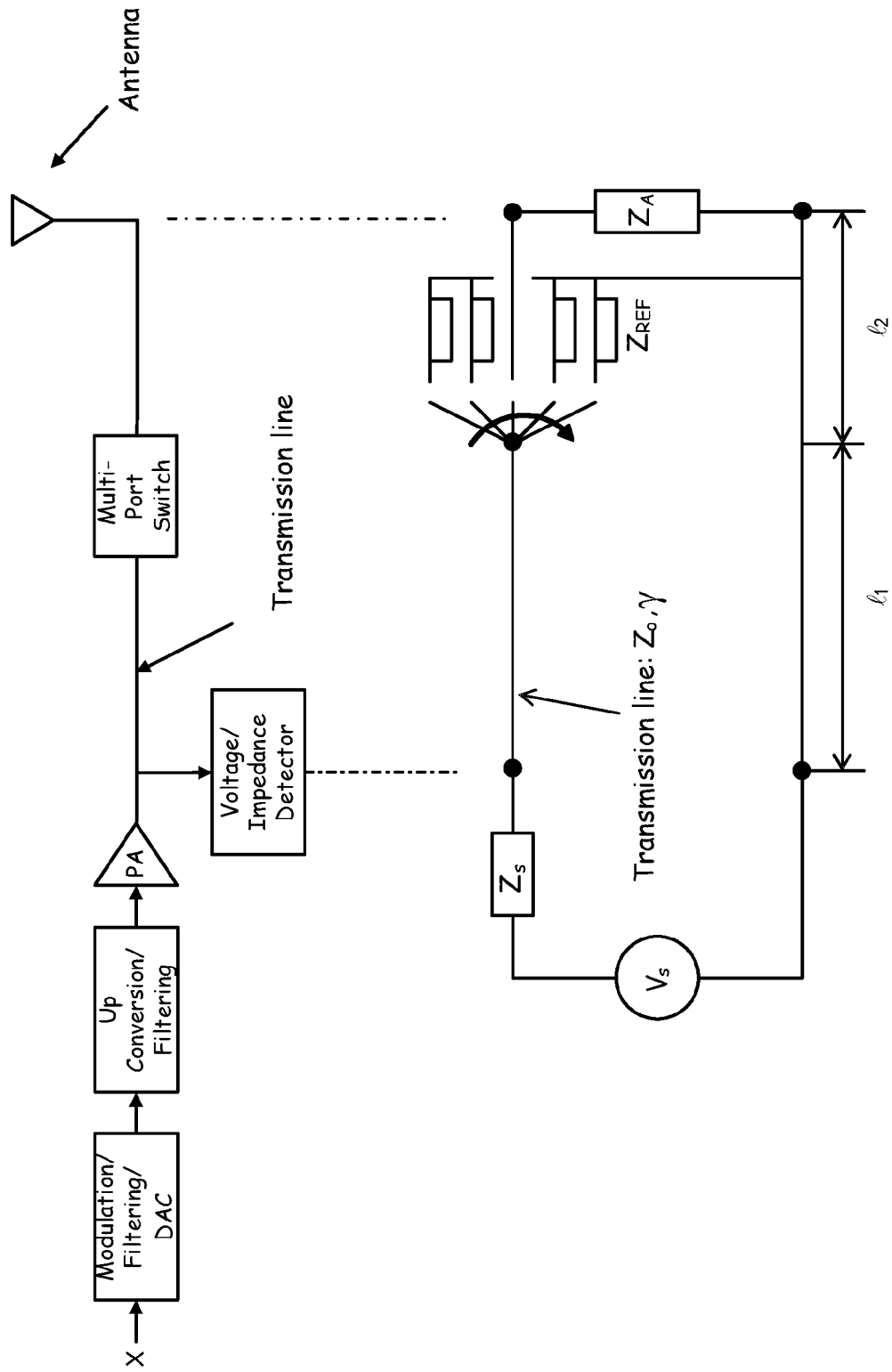
FIG. 9 is a block diagram illustrating an equivalent circuit of a test device for testing a transmitter portion of a wireless device according to one or more embodiments of the present invention.

FIG. 9 is a block diagram illustrating an equivalent circuit of a test device for testing a transmitter portion of a wireless device according to one or more embodiments of the present invention. Note that the multi-port switch may be switched between a number of differing reference impedances. This structure may be used to determine the source impedance of the transmitter section under test.

Figure 10:
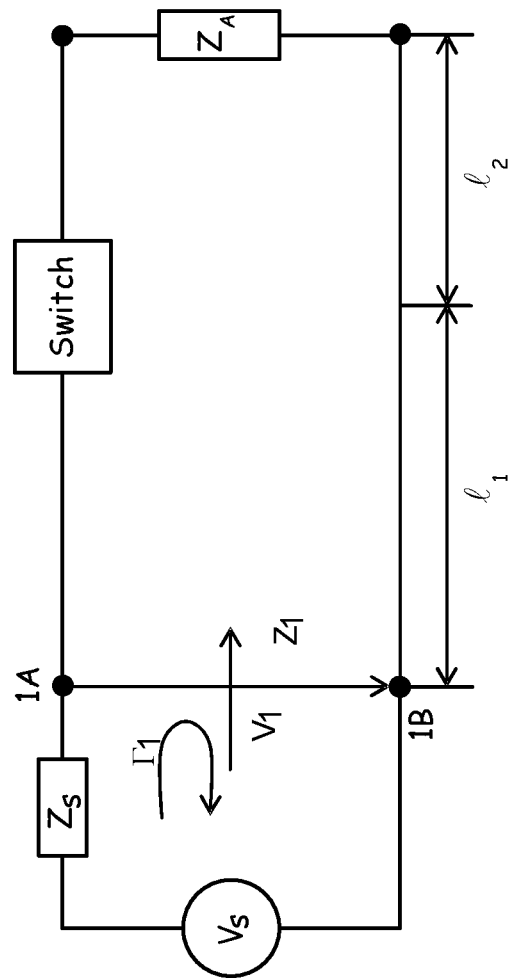
FIG. 10 is a block diagram illustrating an equivalent circuit of a portion of a transmitter section of a wireless device constructed according to one or more embodiments of the present invention.

FIG. 10 is a block diagram illustrating an equivalent circuit of a portion of a transmitter section of a wireless device constructed according to one or more embodiments of the present invention. The equivalent circuit of FIG. 10 may be employed to model a transmitter section during testing and/or operation.

Figure 11:
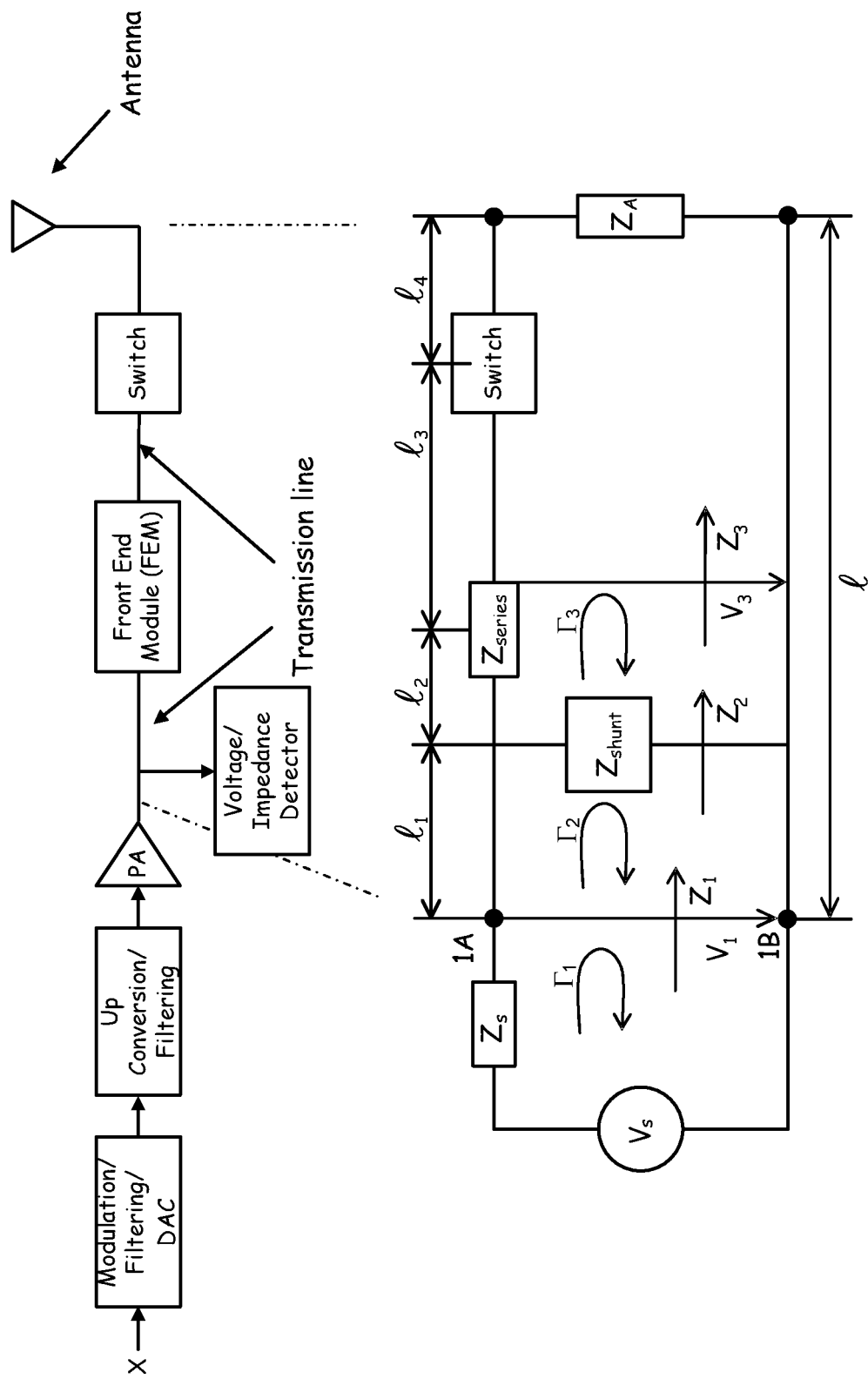
FIG. 11 is a block diagram illustrating an equivalent circuit of a portion of a transmitter section of a wireless device constructed according to one or more embodiments of the present invention.

FIG. 11 is a block diagram illustrating an equivalent circuit of a portion of a transmitter section of a wireless device constructed according to one or more embodiments of the present invention.

The content of FIGS. 9, 10, and 11 and related text describe how to estimate and compensate for variable IC and board level RF parameters. The nominal chip/board parameters $V_S$, $Z_S$, $\gamma$, l, etc. are dictated by the chip/board design. When the parameters $V_S$, $Z_S$, $\gamma$, l, etc. deviate from their nominal values (e.g. due to manufacturing tolerances, temperature variation), the estimates for antenna impedance and power delivered into the antenna become inaccurate. Manufacturing tolerances resulting in chip-to-chip and/or board-to-board variation, the influence of power, core voltage, temperature, and other manufacturing and operational variations result in deviation of these parameters from their nominal values.

Referring particularly to FIG. 9, a transmitter section (output of PA) couples to a multi-port switch that couples to an antenna via a transmission line. A voltage detector is also located along the transmission line but is located on-chip in some embodiments. The multiport switch can be set to terminate the transmission line with one of several (known) reference impedances ($Z_{REF}^i$). Examples of reference impedances are:

$Z_{REF}^0 = Z_o$
$Z_{REF}^1 =$ "open circuit" (i.e. high impedance)
$Z_{REF}^2 = 0$ (i.e. short circuit), etc.

The output $\hat{V}$ or $\tilde{V}$ of the voltage detector is used to estimate the chip/board parameters $V_S$, $Z_S$, $\gamma$, l, etc. The voltage detector is equivalent to an impedance detector. The voltage detector functionally operates as a VNA. The voltage (impedance) detector shown in FIG. 9 may be implemented either on-chip or off-chip. The voltage (impedance) measurement may be performed once (e.g. at start-up) or periodically (e.g. on every transmit frame). The transmit signal used to measure the voltage (impedance) may be an arbitrary, proprietary transmit signal (e.g. a single tone) or a standard compliant TX signal (e.g. preamble or data portion of TX frame).

The multiport switch may be implemented on-chip or off-chip. The multiport switch may be implemented as a single switch or as multiple switches along the transmission line. As example, one switch may be located at the PA output (for estimation of the parameters $V_S$, $Z_S$), while another switch may be located near the antenna port (for estimation of the parameters $\gamma$, l).

FIG. 9 also shows a circuit and transmission line model of the transmit path in FIG. 9, where $V_S$ denotes the equivalent (complex baseband) source voltage, $Z_S$ denotes the equivalent (complex baseband) source impedance, $\gamma$ denotes the propagation constant, and l denotes the length of the transmission line.

Referring to FIG. 10, when the switch is set to terminate the transmission line with reference impedance $Z_{REF}^i$, then the corresponding input voltage $V_1^{(i)}$ at terminals 1A-1B satisfies equation (3.1):

$$V_1^{(i)} = V_S \cdot \frac{Z_1^{(i)}}{Z_1^{(i)} + Z_S} \qquad (3.1)$$

where $V_S$ again denotes the source voltage and $Z_S$ denotes the source impedance. The load impedance at terminals 1A-1B is denoted as $Z_1^{(i)}$ and satisfies equation (3.2):

$$Z_1^{(i)} = Z_o \cdot \frac{1 + \Gamma_1^{(i)}}{1 - \Gamma_1^{(i)}} \qquad (3.2)$$

where $Z_o$ again denotes the characteristic impedance. The reflection coefficient at terminals 1A-1B is denoted as $\Gamma_1^{(i)}$ and satisfies equation (3.3):

$$\Gamma_1^{(i)} = \Gamma_{REF}^{(i)} \cdot e^{-2\gamma l_1} \qquad (3.3)$$

where $\gamma$ again denotes the propagation constant and $l_1$ denotes the length of the transmission line to the switch. The reflection coefficient at the switch is denoted as $\Gamma_{RE}^{(i)}$ and satisfies equations (3.4):

$$\Gamma_{REF}^{(i)} = \frac{Z_{REF}^{(i)} - Z_o}{Z_{REF}^{(i)} + Z_o} \qquad (3.4)$$

By fixing the transmit signal $X=X_0$, four reference impedances are used to determine the chip/board parameters $V_S$, $Z_S$, $\gamma$, and $l_1$ according to equations (3.1)-(3.4). When less than four reference impedances are available, the parameter(s) least likely to vary (e.g. due to manufacturing tolerances or temperature changes) can be assumed to be constant (e.g. trace length $l_1$).

These derivations in can be extended to a more complex front end architecture as shown in FIG. 11. In this example, the impedances $Z_{shunt}$ and $Z_{series}$ may be added to the list of board parameters which can be estimated using reference impedances according to equations (3.1)-(3.4).

Figure 12:
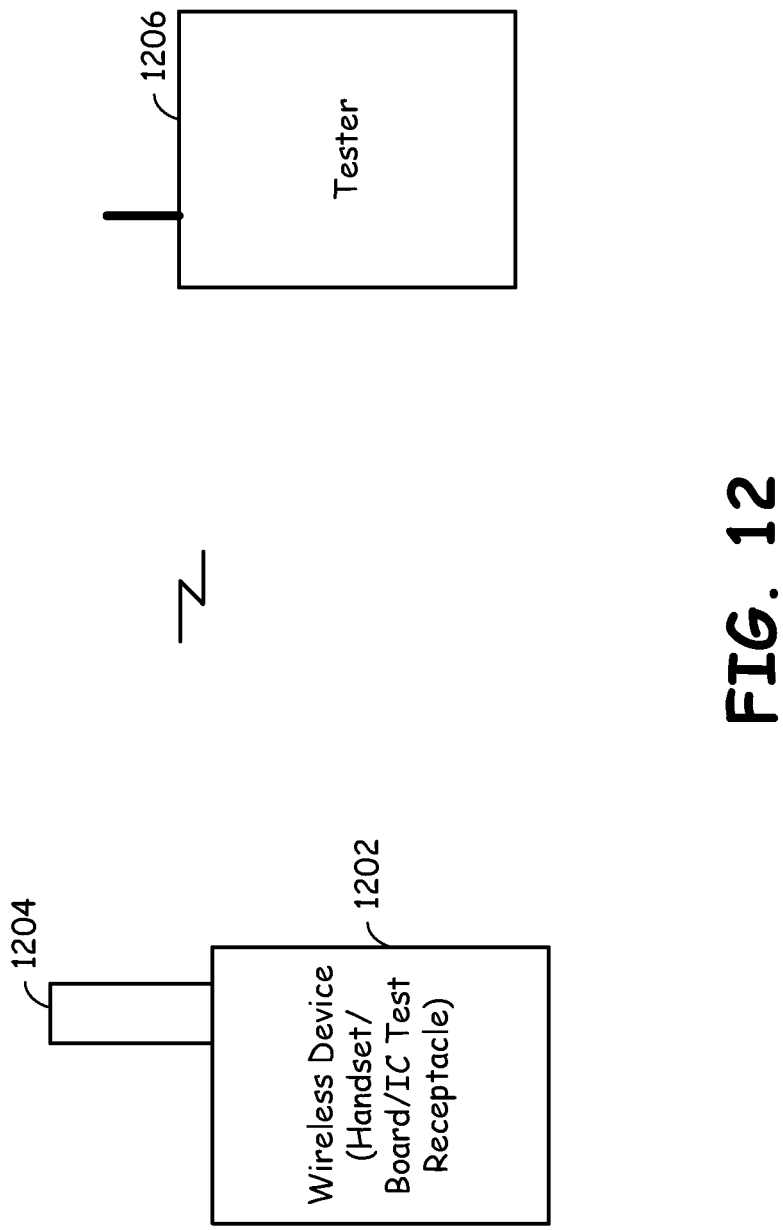
FIG. 12 is a block diagram illustrating a test structure operating constructed according to one or more embodiments of the present invention.

FIG. 12 is a block diagram illustrating a test structure operating according to one or more embodiments of the present invention. As shown in FIG. 12, a wireless device 1202 wirelessly couples to a tester 1206 via antenna 1204 of the wireless device. The wireless device 1202 may be a handset, may be a printed circuit board having a plurality of integrated circuits contained thereon, at least one of which is constructed according to the present invention, or may be an integrated circuit test receptacle for receiving an integrated circuit constructed according to one or more embodiments of the present invention. The antenna 1204 may be configurable such that antenna design may be performed according to the present invention.

One problem with prior art antenna design is that information obtained from a wireless device 1202 is coupled to a tester 1206 via a wired connection. According to the present invention, the wireless device 1202 wirelessly relays information to tester 1206 that may be used in the testing, characterization, or design of antenna 1204. Thus, without a wired connection or any other structure that interferes with the operation of antenna 1204, the structure of FIG. 12 may be more efficiently used in the testing, characterization, or design of antenna 1204 to produce a better antenna design. Further, wired interfaces also can interfere with manufacturing and board level testing. By using the techniques described with reference to the embodiment and teachings of FIG. 12, these problems are also overcome.

With some embodiments of FIG. 12, with the wireless device being a PCB, the PCB may be coupled to configurable antenna 1204 via a wired connection. Further, when the wireless device 1202 is an IC test receptacle, the wireless device 1202 may be coupled to configurable antenna 1204 via a wired connection. Thus, with the embodiment of FIG. 12, the modeling of the transmitter section of the wireless device 1202 and the configurable antenna 1204 coupled thereto may be modeled using any of the structures illustrated with reference to FIGS. 5-11.

Figure 13:
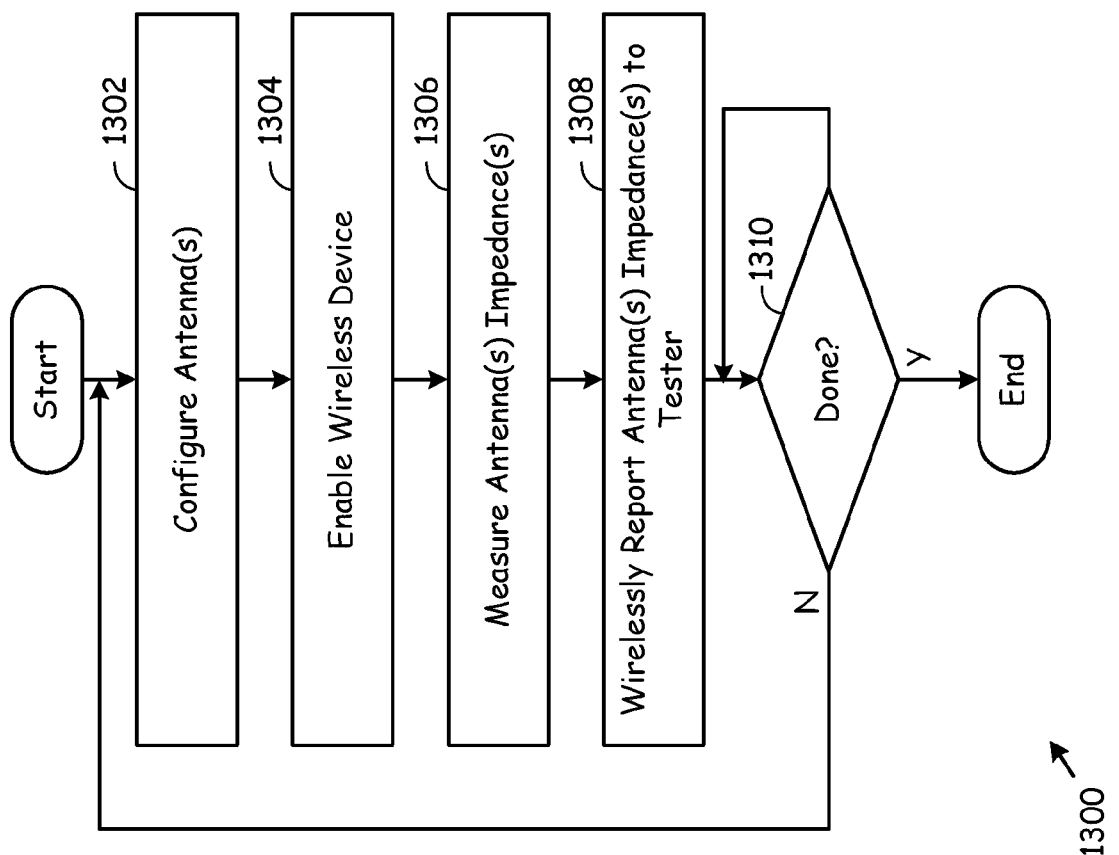
FIG. 13 is a flow chart illustrating operations according to one or more embodiments of the present invention.

FIG. 13 is a flow chart illustrating operations according to one or more embodiments of the present invention. The operations 1300 of FIG. 13 are generally employed during the testing, characterization, or design of a wireless device according to aspects of the present invention. In particular, the operations 1300 of FIG. 13 may be employed to select an antenna design for wireless device 1202 of FIG. 12 (or other device). Alternatively, the operations of FIG. 13 may be employed to determine a source impedance of one or more power amps of the wireless device.

Operation 1300 of FIG. 13 commences with the configuration of one or more antennas of the wireless device (Step 1302). Of course, in some embodiments, a single antenna may be employed with the operations of FIG. 13. Once the antennas are configured, the wireless device is enabled (Step 1304). Enablement of such wireless device includes enabling communication by the wireless device with a tester, e.g., tester 1206 of FIG. 12.

Operation continues with the wireless device measuring the impedance as seen by a power amplifier of one or more or the antennas of the wireless device (Step 1306). Then, the wireless device reports the one or more measured antenna impedances to the tester (Step 1308). Next, it is determined whether the operations of 1300 of FIG. 13 are done (Step 1310). If so, operation ends. If not, operation turns to Step 1302.

The operations 1300 of FIG. 13 support the transfer of test data wirelessly from the wireless device to a tester. Effectively, the operations of FIG. 13 are performed to do vector network analysis at the output of a power amplifier or other such device. This vector network analysis may be done for board qualifications as well as for antenna design.

The operations 1300 of FIG. 13 may be slightly modified to determine the source impedance of one or more RF power amplifiers of the wireless device. In such case, the antenna is configured to provide a plurality of differing known antenna load impedances. Then, for each load impedance, the impedance seen by the RF power amplifier is measured. Based upon the known antenna load impedances and the measured load impedances, the source impedance(s) of the RF power amplifiers may be determined.

Figure 14:
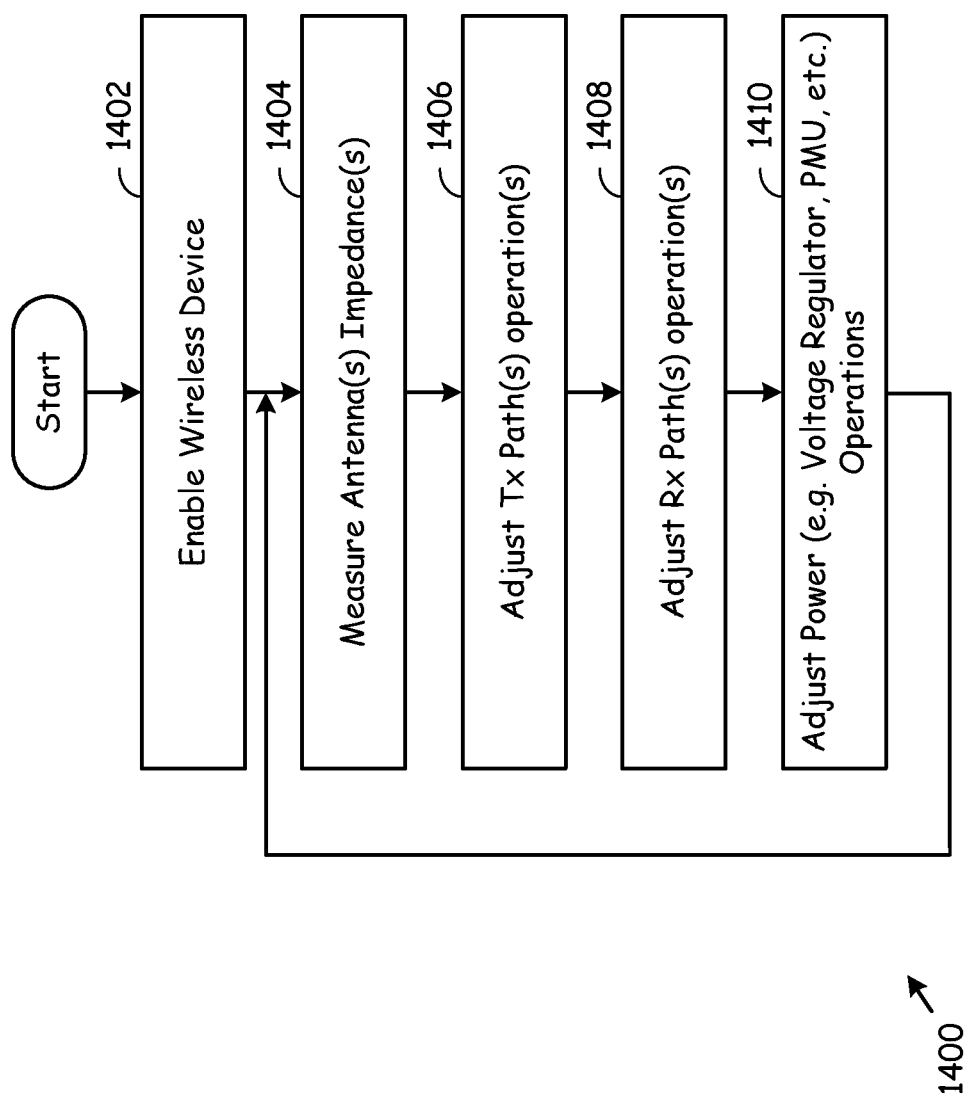
FIG. 14 is a flow chart illustrating operations according to another aspect to the present invention.

FIG. 14 is a flow chart illustrating operations according to another aspect to the present invention. The operations 1400 of FIG. 14 commence with enabling a wireless device that has structure supported according to an embodiment to the present invention (Step 1402). With the device enabled, operation proceeds with measuring the impedance of an antenna, or more than one antenna, as seen by one or more PAs of the wireless device (Step 1404). Operation continues with adjusting the Tx path of at least one Tx path of a wireless device (Step 1406). In adjusting the Tx path, Step 1406 may include altering pre-distortion of a transmit signal produced by baseband circuitry of the wireless device. Further, other operations may include adjusting tuning elements within the PA, mixer, filter, or other elements residing within the Tx path of the wireless device. Such operations may further include adjusting rail voltages supplied to the PA and other components within the Tx path or paths.

Then, operation includes adjusting one or more components of the Rx path or paths on the wireless device (Step 1408). Because in a receive operation, the impedance seen by the LNA of the wireless device is substantially similar to the load impedance seen by the PA during transmit operations, the LNA and other components in the receive path may be adjusted in response to the impedance measured by the impedance measuring circuitry of the wireless device. Thus, at Step 1408, operation may include adjusting tuning components of the LNA, adjusting mixer components of the receive path, adjusting filter components of the receive path, and/or adjusting other operations of the receive path. Further, the operations at Step 1408 may include adjusting baseband processor filtering operations, and other operations performed by the baseband processor that may be affected by a change in the output impedance of the antenna as seen by LNA.

Operations 1400 may further include adjusting the power of the wireless device (Step 1410). For example, the operations of Step 1410 may include adjusting the voltage produced by a voltage regulator that is applied to one or more Tx/Rx path components, adjusting the operation of a power management unit, and/or adjusting other power operations of a wireless device. For example, these power operations may further include adjusting the automatic power control settings of a wireless device. A wireless device must operate within transmit power ranges as defined by operating standards. Variations in load impedance(s) seen by the PA(s) may be indicative that the actual transmit power is not as is expected. Thus, at Step 1410, corrections may be made so that the wireless device is actually transmitting at specified transmit powers. From Step 1410, operation returns to Step 1404. The operations 1400 of FIG. 14 may be performed continually or periodically, depending upon the embodiment.

Figure 15:
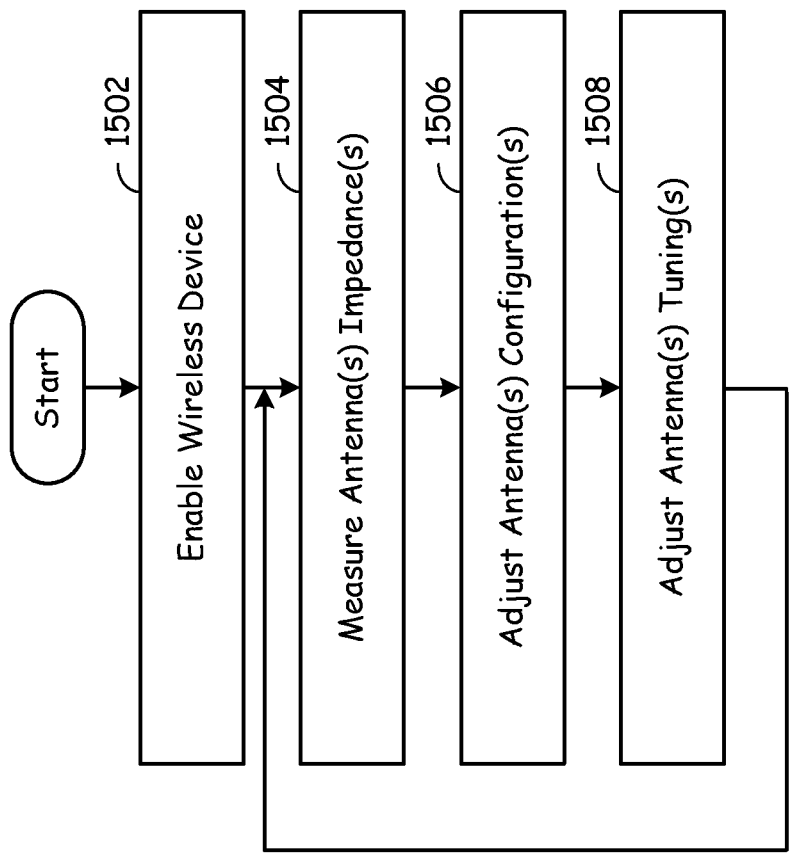
FIG. 15 is a flow chart illustrating other operations according to embodiments of the present invention for adjusting antenna characteristics.

FIG. 15 is a flow chart illustrating other operations according to embodiments of the present invention for adjusting antenna characteristics. Operations 1500 of FIG. 15 include first enabling the wireless device for its operation (Step 1502). Operation continues with the wireless device measuring antenna impedance as seen by one or more PAs of the wireless device (Step 1504). The manner in which Step 1504 is accomplished has been previously described herein.

Operation 1500 continues with adjusting the configuration of one or more antennas of the wireless device (Step 1506). For example, an antenna constructed according to one of the embodiments of the present invention may have a plurality of switching components that are inter-coupled by a plurality of controllable switches. The plurality of controllable switches adjusts the performance of the antenna, such performance consistent with the configuration made at Step 1506. For example, the antenna may be adjusted to have particular gain characteristics across a frequency band of interest. Such gain characteristics may be inconsistent with the operation currently of the transmit path of the wireless device. In such case, the operation of Step 1506 includes adjusting the antenna configuration to better support the wireless operations of the device. For example also, the antenna configuration may be adjusted such that it is directional to not only increase its performance but to create a null in an antenna gain pattern to avoid a blocking signal. Further, the operations of Step 1506 may be performed in order to adjust a MIMO spatial configuration. Moreover, the operation of Step 1506 may be simply performed in order to equalize load impedance across a plurality of PAs of the wireless device. Further, such adjustment at Step 1506 may be simply done to adjust the load impedance of the antenna to more efficiently support transmit operations.

Operation continues with adjusting one or more antenna tuning components of the wireless device (Step 1508). As was previously described with reference to FIG. 2, the wireless device may include one or more tuning networks. Each tuning network may support an individual antenna or a single tuning network may support multiple antennas. By adjusting the antenna tuning network, the load impedance as seen by one or more PAs of the wireless device may be adjusted. Such adjusting of the tuning network may be performed so that the load impedance is better matched to the PA for more efficient operations, e.g., to reduce reflections from the antenna back to the PA. The tuning network of a wireless device of the present invention may include a plurality of lumped capacitive elements, a plurality of lumped inductive elements, a plurality of other elements, and/or a combination of these. Further, a tuning network may include a plurality of switches that support the interconnection of the plurality of lumped elements. By controlling the position of the plurality of switches, the antenna tuning network may be controlled to adjust the effective load impedance or output impedance of one or more antennas of the wireless device.

Figure 16:
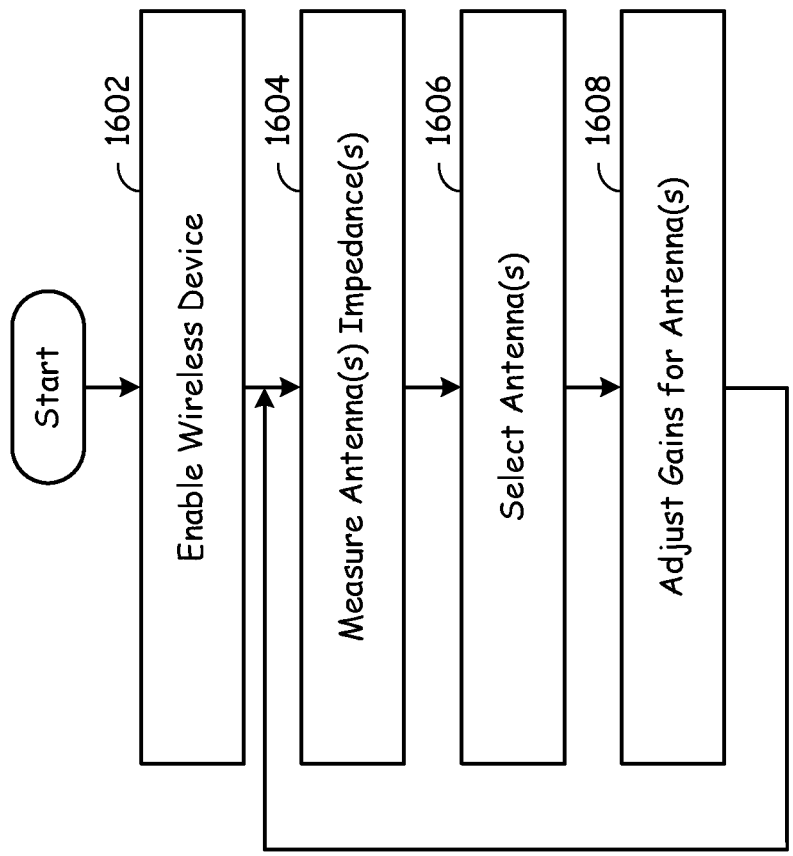
FIG. 16 is a flow chart illustrating operation according to one or more embodiments of the present invention.

FIG. 16 is a flow chart illustrating operation according to one or more embodiments of the present invention. Operations 1600 of FIG. 16 include with first enabling the wireless device (Step 1602). Then, operation proceeds with the wireless device measuring the load impedance of one or more antennas servicing to the wireless device (Step 1604). Based upon the load impedance as seen or determined at the output of each of the PAs of a wireless device, the wireless device will select one or more antennas for servicing wireless communications (Step 1606). The operation at Step 1604 may indicate that one of a plurality of antennas is more efficient due to its effective load impedance at the time. For example, if a user picks up a wireless handset, the interaction of the user's hand with an antenna of the wireless handset may cause that particular antenna to perform poorly. Such potential poor performance is determined by or indicated by the load impedance as seen at a particular PA of the wireless device. Thus, determining that one of the antennas of the wireless device is poorly performing, the wireless device may select a differing antenna to service ongoing communications at Step 1606. Moreover, if a user of the wireless device places the wireless device upon a table or other surface that is at least partially conductive, one or more of the antennas of the wireless device may perform more poorly than other antennas to the wireless device. In such case, the wireless device then selects what it determines to be a better performing antenna from a plurality of available antennas.

The operations 1600 of FIG. 16 may also include adjusting PA gain for one or more serviced antennas (Step 1608). At Step 1604, the wireless device may determine that measured load impedance for each of a plurality of antennas differs. In such case, it may determine that higher gain is required for a PA corresponding to one of the antennas as compared to another of the antennas. Thus, at Step 1608, the wireless device may adjust one or more gains of a power amp or other transmit path components. Further, at Step 1608, based upon measured impedances at Step 1604, the wireless device may adjust gains of receive path components as well.

Figure 17:
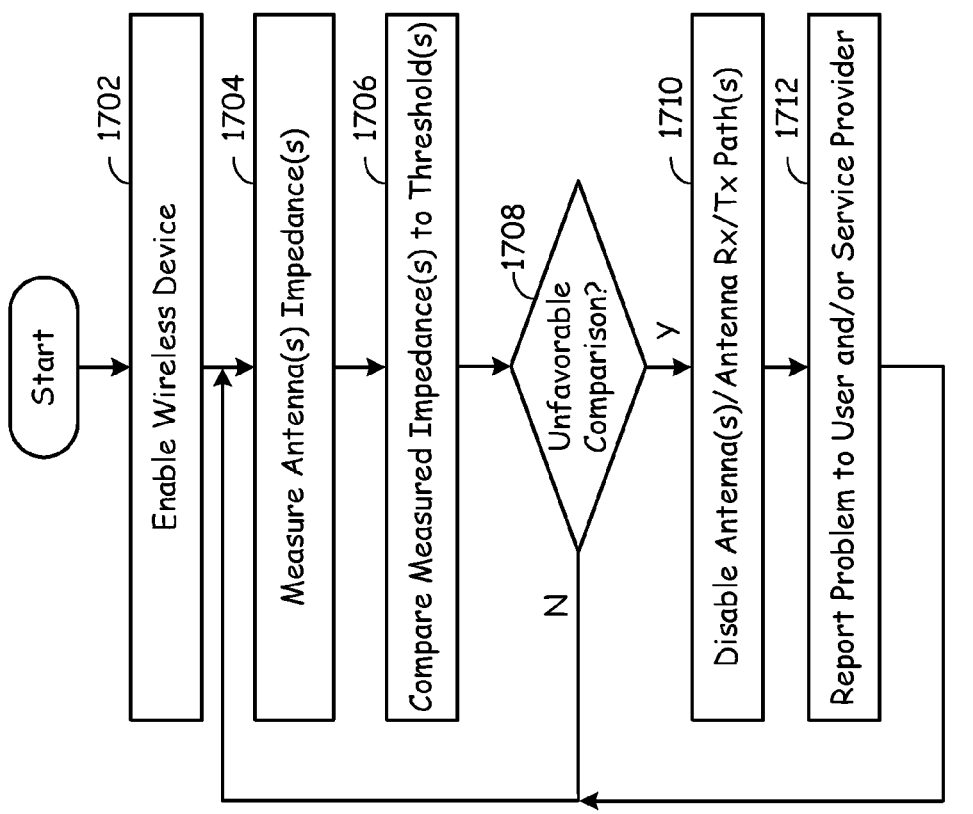
FIG. 17 is a flow chart illustrating additional operations according to various aspects of the present invention.

FIG. 17 is a flow chart illustrating additional operations according to various aspects of the present invention. Operation commences with enabling the wireless device (Step 1702). Operation continues with measuring the load impedance to one or more antennas (Step 1704). Operation continues with comparing the measured impedances to a plurality of corresponding impedance thresholds (Step 1706). Next, at Step 1708, it is determined whether one or more of the comparisons is unfavorable (Step 1708). The comparison of the impedance measured at Step 1704 to the threshold as determined at Step 1706 may indicate that one or more antennas is faulty, e.g., is shorted out, open, or otherwise non-effectively operating. In such case, the wireless device, based upon the determination of Step 1708, may disable an antenna or more than one antenna as well as disabling one or more transmitter receive paths (Step 1710).

Alternatively, or in addition to the operations at Step 1710, the wireless device may report the problem with the antenna(s) as determined to a user or a service provider (Step 1712). In reporting the problem with the antenna to the user, the wireless device may, via the user interface, indicate that one or more antennas is faulty and requires service. Further, in reporting to the service provider at Step 1712, the wireless device may wirelessly communicate the problem to a service provider such as a wireless network service provider or to a manufacture of the phone. In response thereto, the service provider may contact the subscriber or purchaser and indicate that the wireless device should be brought in to be serviced. Further, in this communication, the seller or wireless network provider may indicate that the phone needs to be replaced and offer the subscriber a discount for purchasing a new wireless device.

Figure 18:
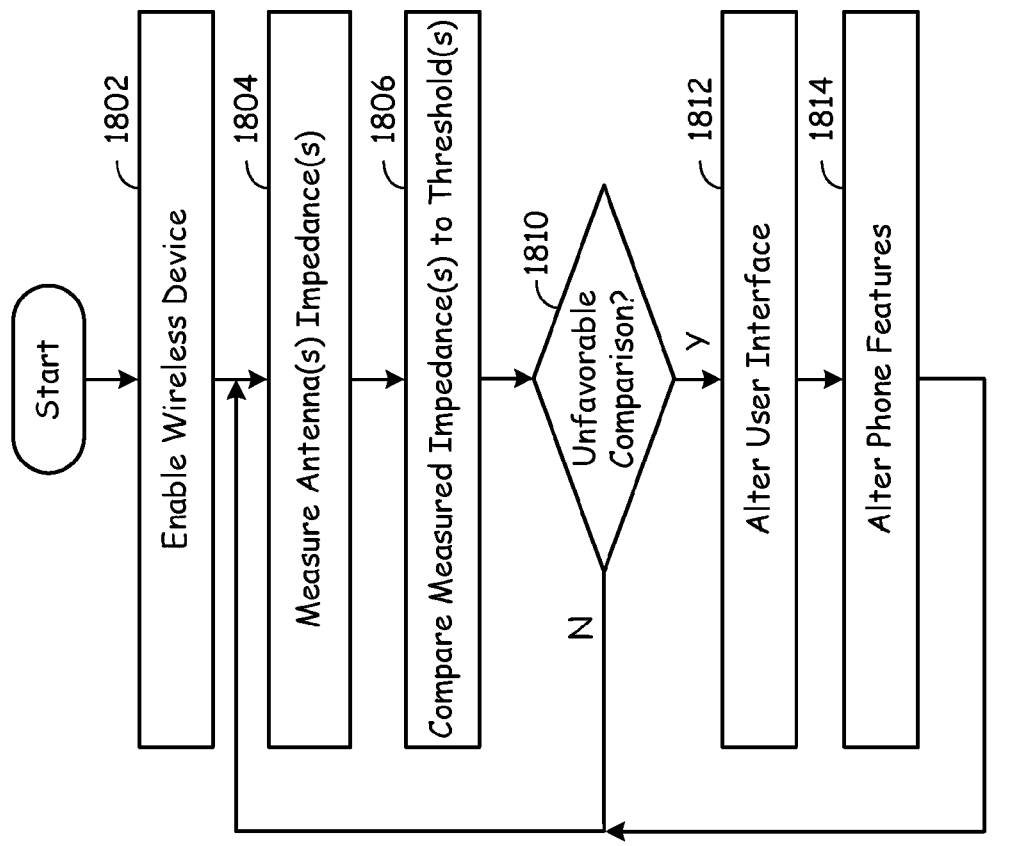
FIG. 18 is a flow chart illustrating operation for adjusting wireless terminal/telephone operations according to one or more aspects to the present invention.

FIG. 18 is a flow chart illustrating operation for adjusting wireless terminal/telephone operations according to one or more aspects to the present invention. Operation 1800 of FIG. 18 commences with enabling the wireless device (Step 1802). Operation continues with measuring the antenna impedance as seen at the output of one or more PAs of the wireless device. Then, the measured impedance or impedances are compared to one or more thresholds (Step 1806). Upon a favorable comparison as determined at Step 1810, operation returns to Step 1804. However, upon an unfavorable comparison at Step 1810, the wireless device will alter its user interface (Step 1812) and/or alter phone features (Step 1814).

Alteration of the user interface at Step 1812 may include disabling a touch screen, for example. When a user of a cellular telephone that has a touch sensitive display picks up the telephone to make a phone call, the user often places the touch sensitive screen against his or her cheek. Unfortunately, the touch of the cheek to the touch sensitive screen may provide input to the wireless telephone that is not desired. Thus, according to the operation of Step 1812, the telephone determines that it has been picked up by the subscriber based upon a change in load impedance as seen at one or more antennas of the wireless device. Based upon the comparison of this change in load impedance of the antennas, the telephone determines that it has been picked up by user and disables the touch screen. Further, detection that the telephone has been picked up via change in input antenna impedance may be further employed to disable operation of a Bluetooth headset, for example, since the user is using the speaker of the telephone.

Examples of operation of Step 1814 include disabling features of a telephone that are not required when the user has the telephone in his or her hand. For example, phone features may be based upon the distant proximity of the telephone to a user. When the phone itself determines that the phone has been picked up by the user, it understands that the telephone is in close proximity to the user. In such case, the telephone disables those features presuming proximity to a user.

Changing load impedance of the antenna may also indicate that the corresponding telephone has been moved with respect to a fixed object, with operation of the telephone modified accordingly. Further, motion of the user about the telephone (or other device) may also be detected by a change in antenna/load impedance. For example, the movement of the device may be detected or the motion of a users hand about the device may be used to alter operation of the device, e.g., detection of such motion may be used to turn the page of an electronic book being displayed by the device.

FIG. 19 is a block diagram illustrating a wired device constructed according to one or more embodiments of the present invention. The wired device 1902 includes, among other elements that are not illustrated in FIG. 19, processing circuitry 1906, Tx path components 1908, Rx path components 1910, interface 1912, impedance detection circuitry 1914, and reference impedance 1916. The wired device 1902 couples to a wired network 1904 via interface 1912. The wired network 1904 may be a wide area network, a local area network, a DSL network, or other wired network that communicates via a wired connection. The interface 1912 interfaces the wired link with wired network 1904 to Tx circuitry 1908, and Rx circuitry 1910.

The impedance seen at the output of the Tx circuitry 1908 may be indicative of the quality of the interconnection with wired network, or other characteristics of the transmit path. Impedance detection circuitry 1914 detects the impedance as seen at the output of the Tx section 1908. The information determined based upon by the impedance detection circuitry 1914 may be employed by processing circuitry 1906 to alter operations of the Tx section 1908 and/or the Rx section 1910. Further, the information determined by impedance detection circuitry 1914 may be further employed to send a notice to a service department that the wired connection between wired device 1902 and wired network 1904 requires servicing. Further, operations previously described herein with reference to FIGS. 1-18 may be applied by analogy to a wired interconnection between wired device 1902 and wired network 1904.

The operations of the wired device 1902 of FIG. 19 commences with enabling the wired device 1902. With the wired device 1902 enabled, operation proceeds with measuring the impedance at an output of the wired device 1902, e.g., at an edge of an IC upon which a communication interface is constructed. Operation continues with adjusting one or more tuning device(s) of one or more transmitter sections 1908 of the wired device 1902. Such operation may include altering pre-distortion of a transmit signal produced by baseband circuitry 1906 of the wireless device 1902. Further, other operations may include adjusting tuning elements within a PA, mixer, filter, or other elements residing within the Tx path 1908 of the wired device 1902. Such operations may further include adjusting rail voltages supplied to the PA and other components within the Tx path 1908 or paths.

Then, operation includes adjusting one or more components of the Rx path 1910 or paths on the wired device 1902. Because in a receive operation, the impedance seen by a receiver amplifier of the wired device 1902 is substantially similar to the load impedance seen by the PA during transmit operations, the receiving amplifier and other components in the receive path 1910 may be adjusted in response to the impedance measured by the impedance measuring circuitry of the wired device. Thus, operation may include adjusting tuning components of the amplifier, adjusting mixer components of the receive path, if any, adjusting filter components of the receive path 1910, and/or adjusting other operations of the receive path 1910. Further, the operations may include adjusting baseband processor filtering operations, and other operations performed by the baseband processor that may be affected by a change in the output impedance of the antenna as seen by LNA.

Operations may further include adjusting the power of the wired device 1902. For example, the operations may include adjusting the voltage produced by a voltage regulator that is applied to one or more Tx/Rx path components, adjusting the operation of a power management unit, and/or adjusting other power operations of a wired device. For example, these power operations may further include adjusting the automatic power control settings of a wired device. A wired device 1902 must operate within transmit power ranges as defined by operating standards. Variations in load impedance(s) seen by the PA(s) may be indicative that the actual transmit power is not as is expected. Thus, corrections may be made so that the wired device is actually transmitting at specified transmit powers.

The terms "circuit" and "circuitry" as used herein may refer to an independent circuit or to a portion of a multifunctional circuit that performs multiple underlying functions. For example, depending on the embodiment, processing circuitry may be implemented as a single chip processor or as a plurality of processing chips. Likewise, a first circuit and a second circuit may be combined in one embodiment into a single circuit or, in another embodiment, operate independently perhaps in separate chips. The term "chip," as used herein, refers to an integrated circuit. Circuits and circuitry may comprise general or specific purpose hardware, or may comprise such hardware and associated software such as firmware or object code.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to." As may even further be used herein, the term "operable to" indicates that an item includes one or more of power connections, input(s), output(s), etc., to perform one or more its corresponding functions and may further include inferred coupling to one or more other items. As may still further be used herein, the term "associated with," includes direct and/or indirect coupling of separate items and/or one item being embedded within another item. As may be used herein, the term "compares favorably," indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

The invention claimed is:

1. A method for operating an integrated circuit wireless transceiver comprising:
    impedance determination circuitry determining a load impedance at an output of at least one Radio Frequency (RF) power amplifier of the integrated circuit wireless transceiver wherein the impedance determination circuitry is operably disposed within the integrated circuit wireless transceiver and further operatively coupled to baseband processing circuitry to monitor and alter operation of the integrated circuit wireless transceiver; and
    altering an integrated circuit wireless transceiver path gain level setting to match a target power in accordance with the determined load impedance at the output of the at least one RF power amplifier and altering at least one additional operating parameter of the integrated circuit wireless transceiver based upon the determined load impedance.

2. The method of claim 1, wherein altering at least one additional operating parameter of the integrated circuit wireless transceiver is selected from the group consisting of:
    altering a rail voltage setting;
    altering baseband processing pre-distortion settings;
    altering baseband processing receive signal processing operations; and
    altering Multi Input Multi Output (MIMO) settings.

3. The method of claim 2, wherein the integrated circuit wireless transceiver includes transmit and receive paths and wherein the impedance determination circuitry further monitors load impedance at a low noise amplifier and the baseband processing circuitry adjusts at least a portion of the receive path circuitry operably disposed downstream of the low noise amplifier of the integrated circuit wireless transceiver.

4. The method of claim 2, wherein altering at least one additional operating parameter of the integrated circuit wireless transceiver is selected from the group consisting of:
    altering tuning settings of at least one transmit path component;
    altering tuning settings of at least one receive path component;
    altering antenna configuration settings;
    altering antenna tuning parameters; or
    altering antenna diversity settings.

5. The method of claim 1, wherein impedance determination circuitry determining load impedance at an output of at least one Radio Frequency (RF) power amplifier of the integrated circuit wireless transceiver comprises determining load impedance for a plurality of RF power amplifiers.

6. The method of claim 1, wherein impedance determination circuitry determining load impedance at an output of at least one Radio Frequency (RF) power amplifier of the integrated circuit wireless transceiver comprises using Vector Network Analysis (VNA) to determine the load impedance.

7. The method of claim 1, wherein impedance determination circuitry determining a load impedance at an output of at least one Radio Frequency (RF) power amplifier of the integrated circuit wireless transceiver is performed during preamble packet operations.

8. The method of claim 1, wherein impedance determination circuitry determining load impedance at an output of at least one Radio Frequency (RF) power amplifier of the integrated circuit wireless transceiver is performed during data packet operations.

9. The method of claim 1, wherein impedance determination circuitry determining a load impedance at an output of at least one Radio Frequency (RF) power amplifier of the integrated circuit wireless transceiver is performed for a single tone.

10. The method of claim 1, wherein impedance determination circuitry determining a load impedance at an output of at least one Radio Frequency (RF) power amplifier of the integrated circuit wireless transceiver is performed for multiple tones.

11. A method for operating an integrated circuit wireless transceiver comprising:
    for each of a plurality of antennas and corresponding applied antenna impedances coupled to at least one Radio Frequency (RF) power amplifier, impedance determination circuitry determining a load impedance at an output of at least one RF power amplifier of the integrated circuit wireless transceiver, wherein the impedance determination circuitry is operably disposed within the integrated circuit radio transceiver and further operatively coupled to baseband processing circuitry to monitor and alter operation of the integrated circuit radio transceiver;
    based upon the plurality of load impedances determined, determining source impedances of each of the at least one RF power amplifiers and altering a transmit path gain level setting to a target setting.

12. An apparatus of an integrated circuit wireless transceiver, comprising:

impedance determination circuitry operable to determine a load impedance at an output of at least one Radio Frequency (RF) power amplifier of the integrated circuit wireless transceiver wherein the impedance determination circuitry is operably disposed within the integrated circuit wireless transceiver; and processing circuitry coupled to the impedance determination circuitry and operable to alter an integrated circuit wireless transceiver path gain and at least one additional operating parameter of the integrated circuit wireless transceiver to compensate for load mismatches based upon the determined load impedance.

13. The apparatus of claim 12, wherein the integrated circuit wireless transceiver comprises a transmitter and receiver and the processing circuitry altering a transceiver path gain and at least one additional operating parameter of the integrated circuit wireless transceiver includes one of:

altering tuning settings of at least one transmit path component;
altering tuning settings of at least one receive path component;
altering a rail voltage setting;
altering baseband processing pre-distortion settings;
altering baseband processing receive signal processing operations;
altering antenna configuration settings;
altering antenna tuning parameters;
altering antenna diversity settings; or
altering Multi Input Multi Output (MIMO) settings.

14. The apparatus of claim 12, wherein the impedance determination circuitry is further operable to determine the load impedance at a low noise amplifier and the processing circuitry adjusts at least a portion of receive path circuitry operably disposed downstream of the low noise amplifier of the integrated circuit wireless transceiver.

15. The apparatus of claim 12, wherein the impedance determination circuitry comprises dedicated circuitry.

16. The apparatus of claim 12, wherein the impedance determination circuitry determines load impedance at an output of at least one Radio Frequency (RF) power amplifier of the integrated circuit wireless transceiver by determining load impedance for a plurality of RF power amplifiers.

17. The apparatus of claim 12, wherein the impedance determination circuitry determines load impedance at an output of at least one Radio Frequency (RF) power amplifier of the integrated circuit wireless transceiver by using Vector Network Analysis (VNA) to determine the load impedance.

18. The apparatus of claim 12, wherein the impedance determination circuitry determines load impedance at an output of at least one Radio Frequency (RF) power amplifier of the integrated circuit wireless transceiver during preamble packet operations.

19. The apparatus of claim 12, wherein the impedance determination circuitry determines load impedance at an output of at least one Radio Frequency (RF) power amplifier of the integrated circuit wireless transceiver during data packet operations.

20. The apparatus of claim 12, wherein the impedance determination circuitry determines load impedance at an output of at least one Radio Frequency (RF) power amplifier of the integrated circuit wireless transceiver for one or more tones.

* * * * *